(12) United States Patent
Yamada

(10) Patent No.: US 8,714,653 B2
(45) Date of Patent: May 6, 2014

(54) SUPPORTING STRUCTURE OF HEADREST BRACKET

(75) Inventor: Nobuo Yamada, Kariya (JP)

(73) Assignee: Niron Technica Co., Ltd., Aichi (JP)

( * ) Notice: Subject to any disclaimer, the term of this patent is extended or adjusted under 35 U.S.C. 154(b) by 146 days.

(21) Appl. No.: 13/190,607

(22) Filed: Jul. 26, 2011

(65) Prior Publication Data

US 2012/0025583 A1 Feb. 2, 2012

(30) Foreign Application Priority Data

Jul. 30, 2010 (JP) ................................ 2010-173142
Sep. 7, 2010 (JP) ................................ 2010-199535

(51) Int. Cl.
*A47C 7/02* (2006.01)

(52) U.S. Cl.
USPC ........................................ 297/452.2; 297/391

(58) Field of Classification Search
USPC ....................................... 297/391, 452.2, 410
See application file for complete search history.

(56) References Cited

U.S. PATENT DOCUMENTS

| 4,695,097 | A | * | 9/1987 | Muraishi | 297/452.18 |
| 5,131,721 | A | * | 7/1992 | Okamoto | 297/452.18 |
| 5,954,395 | A | * | 9/1999 | Moulins et al. | 297/218.4 |
| 6,132,003 | A | * | 10/2000 | Sakurai et al. | 297/452.18 |
| 6,375,267 | B1 | * | 4/2002 | Ishikawa | 297/452.18 |
| 6,595,591 | B2 | * | 7/2003 | Fourrey et al. | 297/440.11 |
| 6,832,816 | B2 | * | 12/2004 | Yamada | 297/391 |
| 2005/0127736 | A1 | * | 6/2005 | Ohchi et al. | 297/396 |
| 2005/0146190 | A1 | * | 7/2005 | Taatjes | 297/410 |
| 2007/0152489 | A1 | * | 7/2007 | Ishizuka | 297/411.32 |
| 2012/0139321 | A1 | * | 6/2012 | Wu | 297/391 |
| 2013/0106163 | A1 | * | 5/2013 | Purpura et al. | 297/403 |

FOREIGN PATENT DOCUMENTS

| JP | 7-031526 A | 2/1995 |
| JP | 8-182569 A | 7/1996 |
| JP | 2002-283893 A | 10/2002 |
| JP | 2002-315649 A | 10/2002 |
| JP | 2004-322881 A | 11/2004 |
| JP | 2005-138754 A | 6/2005 |
| JP | 2008-207807 A | 9/2008 |

* cited by examiner

*Primary Examiner* — David R Dunn
*Assistant Examiner* — Richard Lowry
(74) *Attorney, Agent, or Firm* — Westerman, Hattori, Daniels & Adrian, LLP

(57) ABSTRACT

A supporting structure of a headrest bracket is disclosed comprising attaching portions (flat areas in the frontal view) provided on an upper frame of a vehicle seat, with attaching wall portions formed on both ends of each flat attaching portion, whereby one side of the headrest bracket is put onto the attaching portion, so that welding points made between the free ends of the attaching wall and on the sides of the headrest bracket are provided, and the free ends are welded, and the welding point made between the upper and/or lower ends of the attaching portion and on the sides of the headrest bracket is horizontally welded.

12 Claims, 56 Drawing Sheets

Pressing process creates Angle θ.

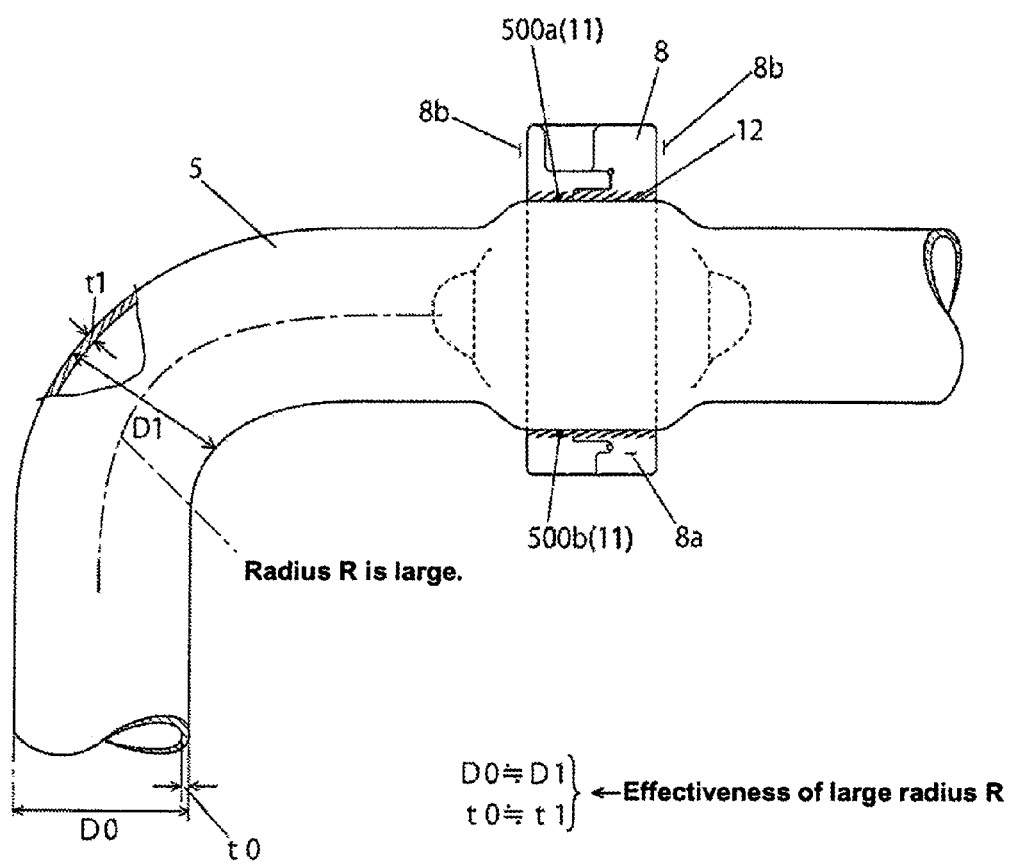

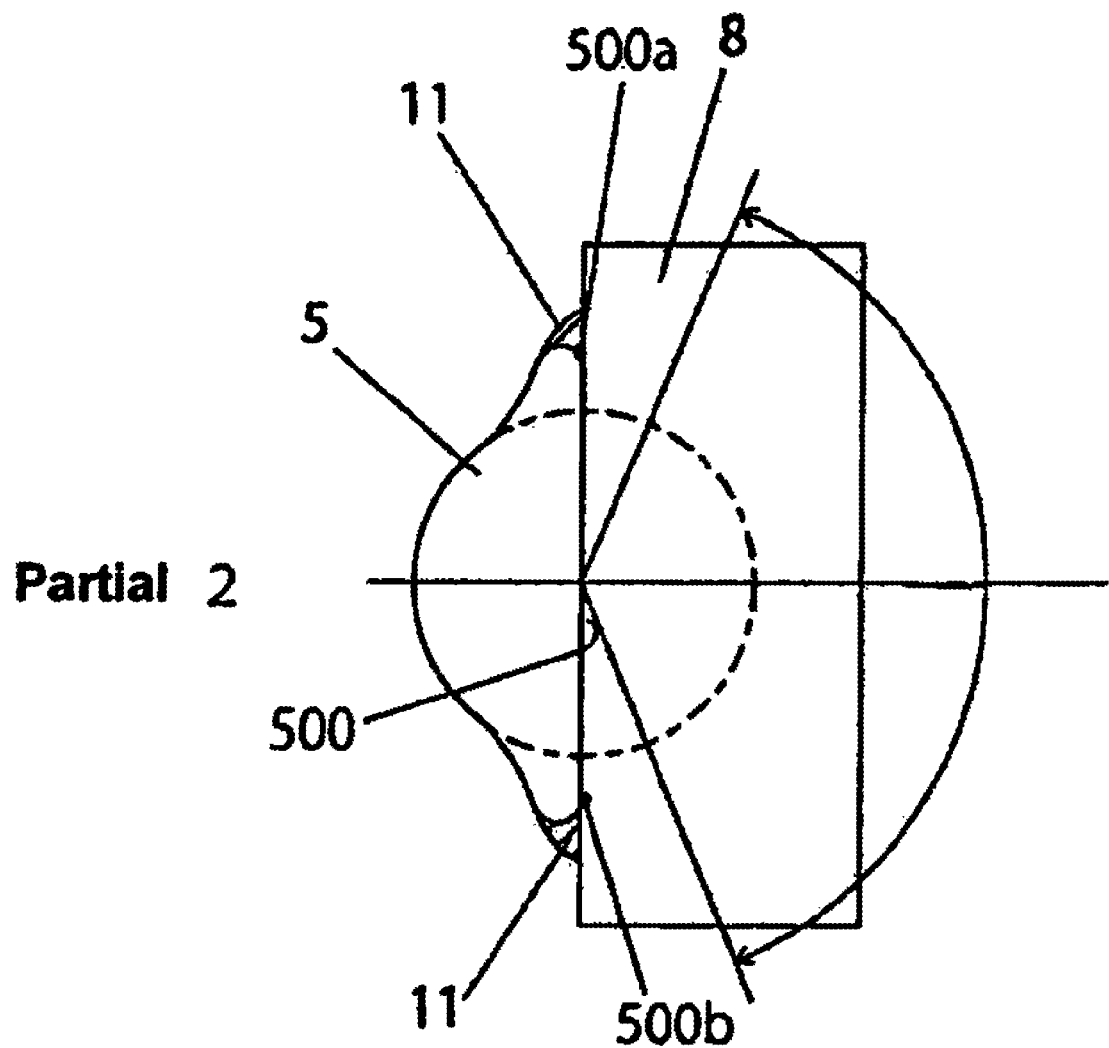

Fig. 7-4

|  | 1 | 2 | Full |
|---|---|---|---|
| Welding cost | Slightly weak | Medium | Strong |
| Strength | Slightly weak | Medium | Strong |

No significant difference

Welding is strengthened if the welding point made between the upper frame and the bracket is near the orbit of the round pipe.

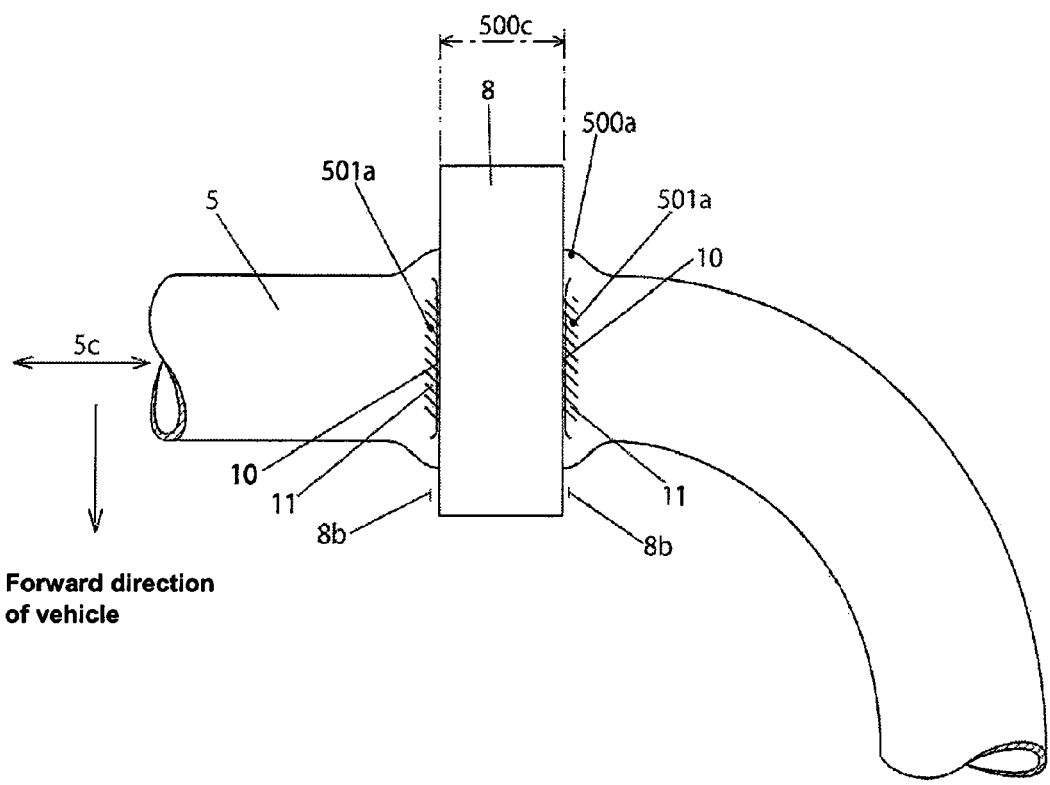

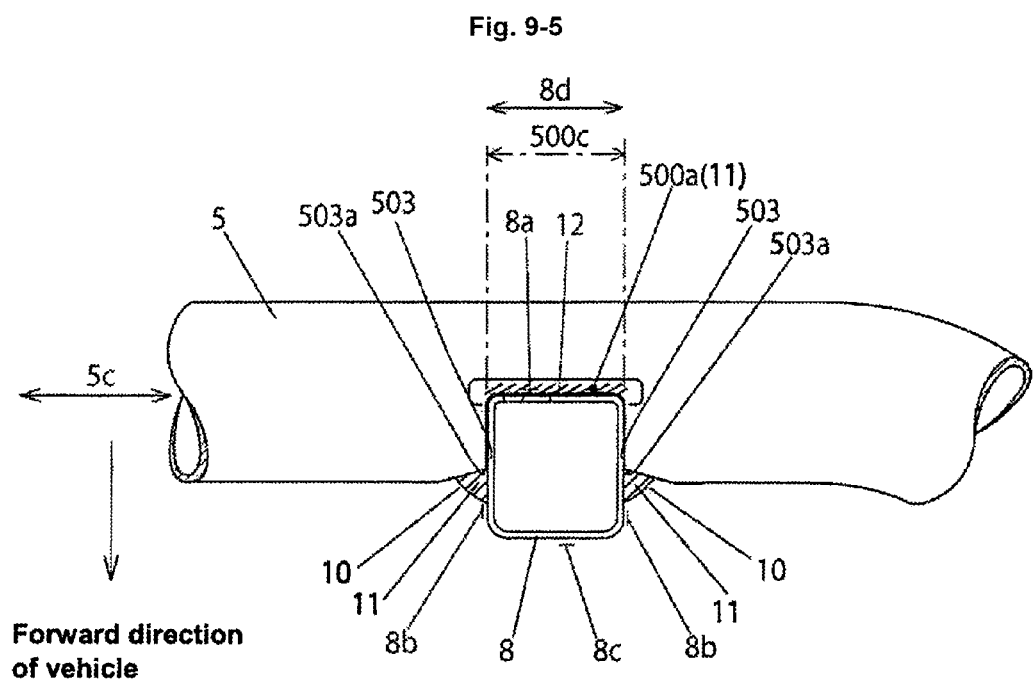

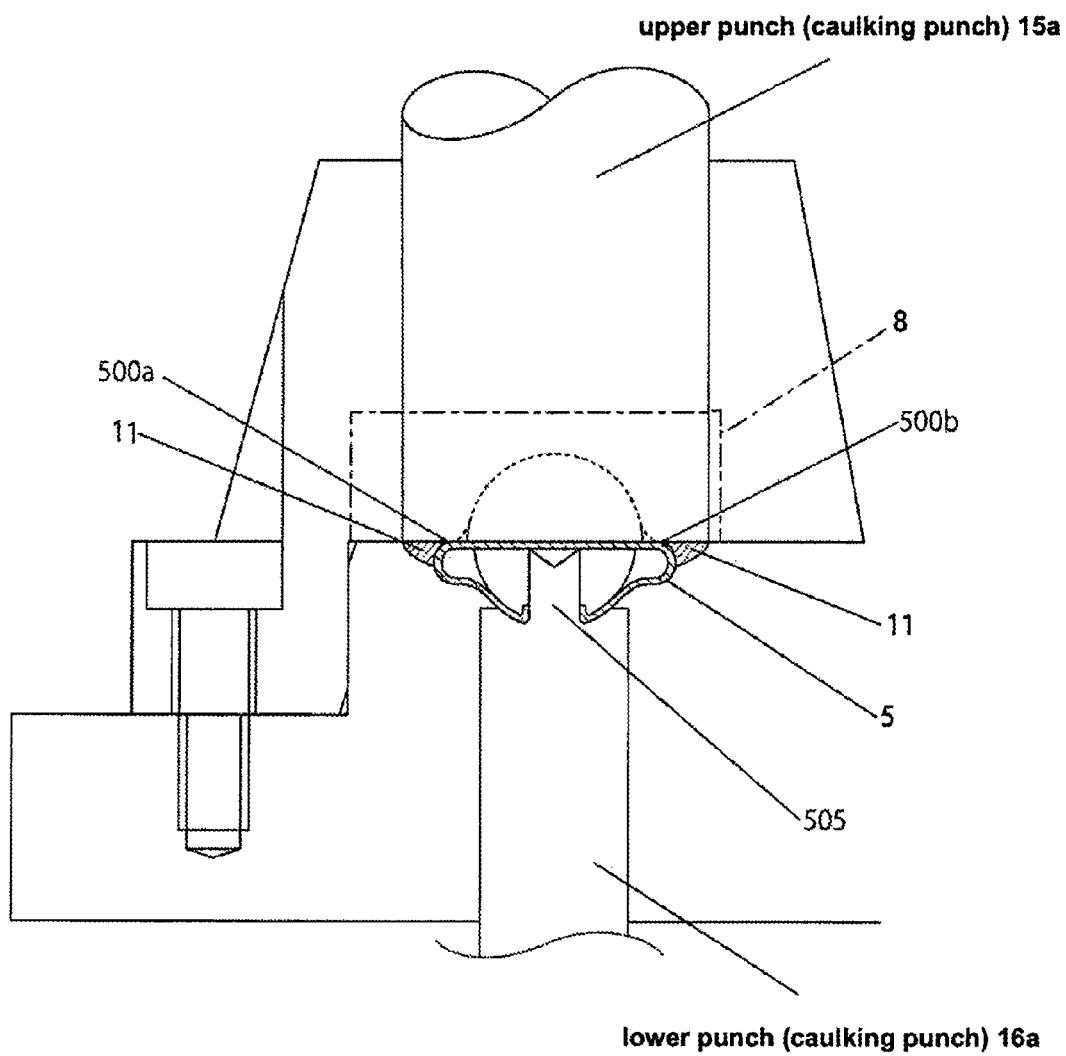

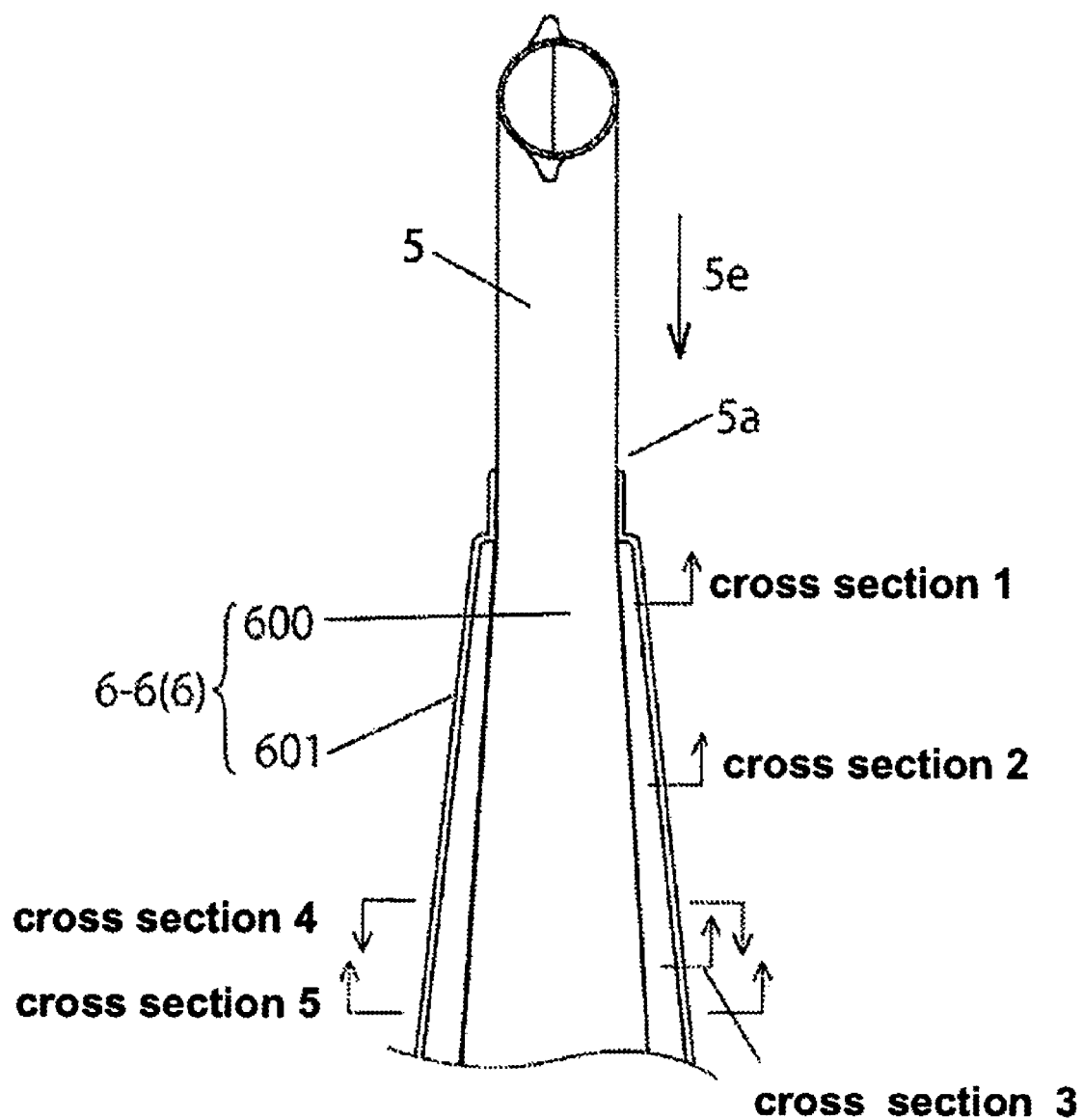

Positioning 3c: at least 3 points or more (arbitrarily)

Clearance C1 = A1 − B1 = little clearance due to positioning

Clearance C1 = A1 − B1 = little clearance due to positioning

Clearance C2 = A2 − B2 = to prevent unlatching in the direction of α and β (to fix).

Even if there is an accidental error in the accuracy of size, Clearance is necessary since perfect fitting is expected.

(a)

| Type | Bracket | | | Upper frame | |
|---|---|---|---|---|---|
| | Upper (upper end) | Middle | Lower (lower end) | Vertical direction | Lateral direction |
| A (a) | ○ | | | ○ | |
| B (a) | | ○ | | ○ | |
| C (a) | | | ○ | ○ | |
| D (a) | ○ | | | ○ | ○ |
| E (a) | | ○ | | ○ | ○ |
| F (a) | | | ○ | ○ | ○ |

(b)

| Type | Bracket | | | Upper frame | |
|---|---|---|---|---|---|
| | Left (left end) | Middle | Right (right end) | Vertical direction | Lateral direction |
| A (b) | ○ | | | | ○ |
| B (b) | | ○ | | | ○ |
| C (b) | | | ○ | | ○ |
| D (b) | ○ | | | ○ | ○ |
| E (b) | | ○ | | ○ | ○ |
| F (b) | | | ○ | ○ | ○ |

Fig. 25-2

| Type | Unit integration | | |
|---|---|---|---|
| | Caulking | Positioning | Welding |
| A (c) | ○ | | |
| B (c) | ○ | ○ | |
| C (c) | ○ | | ○ |
| D (c) | | ○ | ○ |
| E (c) | ○ | ○ | ○ |

FIG. 25-3

| Type | ○ | △ | □ | ▭ |
|---|---|---|---|---|
| A (d) | ○ | | | |
| B (d) | | ○ | | |
| C (d) | | | ○ | |
| D (d) | | | | ○ |
| E (d) | ○ | ○ | | |
| F (d) | ○ | | ○ | |
| G (d) | ○ | | | ○ |
| H (d) | | ○ | ○ | |
| I (d) | | ○ | | ○ |
| J (d) | | | ○ | ○ |

(Conventional type)

5000

8000 deflection X

SUPPORTING STRUCTURE OF HEADREST BRACKET

TECHNICAL FIELD

Disclosed is a supporting structure of a headrest bracket (hereinafter referred to as a bracket), more specifically a supporting structure of a headrest bracket on which the specific position of the headrest on an upper frame of an auto vehicle seat is provided by the bracket and can be sustained in emergency situations if the auto vehicle collides with another vehicle frontally, rearwards, and/or sidewards.

BACKGROUND OF THE INVENTION

If any emergency situation should occur, and if the head and/or neck are not protected by the headrest, or if the upper body is not protected by the seat back (upper frame/seat back frame), whiplash or other injuries may occur. Thus, various countermeasures have been taken. However, it became apparent that in the event of an emergency situation, the strength of the headrest (including the bracket or upper frame) and side frame is not sufficient. One example of such insufficient strength is seen in FIG. 27 which shows the upper frame deflected by the force of a collision (Deflection X), thus disclosing the lack of strength.

Therefore, it is necessary to obtain an appropriate structure of the bracket and upper frame, or of each structure or series of structures of the upper frame/side frame, so that problems such as lack of strength are solved. The countermeasures to be taken in the conventional arts will be reviewed here. The countermeasures should be taken comprehensively and variedly without limiting the structure of the bracket and upper frame, of each structure or series of structures of the upper frame/side frame.

The first subject, "Structure of Bracket and Upper Frame" refers to Japanese Published Unexamined Application No. 2005-138754, entitled "Supporting Structure of Headrest for Vehicles" and No. H08-182569, entitled "Structure of Seatback Frame." Either structure has a common feature in which the bracket is welded onto a flat attaching portion which is provided by pressing the upper frame. Thus, the welding is vertically done. That is, the welding is done on the surface (in the direction of vehicle movement). Therefore, as shown in FIG. 27, the upper frame is deflected upon collision impact, thus showing its inherent weakness.

The second subject, "Auxiliary Means for Improving the Strength of the Structure of the Bracket and Upper Frame" refers to Japanese Published Unexamined Application No. 2008-207807, entitled "Supporting Structure of Headrest" and No. 2002-315649, entitled "Seatback Frame for Vehicles." The former application discloses that the strength of the upper frame is improved by providing the upper frame with a reinforcing plate. The latter application discloses a structure of a pair of protrusions opposingly formed within the attaching portion of the upper frame and bracket, with those protrusions being welded together.

The third subject, "Structure of Side Frame (front and rear panels)" refers to Japanese Published Unexamined Application No. 2004-322881, entitled "Seatback for Vehicles" and No. 2002-283893, entitled "Seatback Frame of Seat for Vehicles" and No. H07-31526, entitled "Seatback Frame." The side frame unit comprising side panels in which the front and rear panels have a special structure, or in which another structure such as an insert brace, a reinforcing bead or the like is added.

Patent Document 1: Japanese Published Unexamined Application No. 2005-138754
Patent Document 2: Japanese Published Unexamined Application No. H08-182569
Patent Document 3: Japanese Published Unexamined Application No. 2008-207807
Patent Document 4: Japanese Published Unexamined Application No. 2002-315649
Patent Document 5: Japanese Published Unexamined Application No. 2004-322881
Patent Document 6: Japanese Published Unexamined Application No. 2002-283893
Patent Document 7: Japanese Published Unexamined Application No. H07-31526

SUMMARY OF THE INVENTION

In the above prior arts, it is believed that the first subject, "Structure of Bracket and Upper Frame" may lack strength, and there may still be some problems about emergency procedures. The second subject, "Structure of Bracket and Upper Frame" needs further improvements for reducing work and expense. The third subject, "Structure of Side Frame" does not refer to the substantive side frame unit and thus may lack strength, and there may still be some problems about emergency procedures.

In the disclosed structure, the strength of the upper frame and bracket is improved by reinforcing the welded places of the brackets and upper frames by using the flat area of the attaching portion, the pressing process and by using the cutout of the upper frame. Further, the bracket is reinforced by inserting a pin into the upper frame, so that the upper frame and bracket are mutually and synergistically reinforced.

Further, the front panel and rear panel are reinforced by caulking them together, so that the side frame unit is also reinforced.

The strength of the upper frame and headrest frame are improved by increasing the number of welding portions between the headrest bracket and upper frame, or by using the flat area of the attaching portion and/or the force resistance of the welded portions along the vertical direction.

A supporting structure of a headrest bracket comprising attaching portions (flat areas in frontal view) provided on the upper frame of a vehicle seat, with attaching wall portions vertically formed on both lateral ends of each flat attaching portion, wherein one side of the headrest bracket is put onto the attaching portion so that the welding points made between the free ends of the attaching wall portions and on both sides of the headrest bracket provided on the free ends are vertically welded, and the welding point made between the upper and/or lower ends of the attaching portion and sides of the headrest bracket are horizontally welded.

The strength of the upper frame and headrest bracket is also improved by increasing the number of welding points between the headrest bracket and upper frame, and by using the flat area of the attaching portion of the upper frame, and by using the pressing process and the cutout portion of the upper frame.

A supporting structure comprises an upper frame of a vehicle seat and a headrest bracket, two slits being cut in the upper frame, with the portion of the upper frame between the slits being pressed flat to form an attaching portion, with vertical half cutout portions thus being formed at both ends of the attaching portion, and with one side of the headrest bracket being attached to the attaching portion so that a space for welding is formed between the free end of the attaching portion and vertical half cutout portions, and on both sides of the headrest bracket, and with another welding structure on which the upper and/or lower ends of the attaching portion are welded in a selectable manner to one side of the headrest bracket in the horizontal direction to the upper frame.

The strength of the upper frame and headrest bracket of the structure is also improved by protecting (supporting) both sides of the headrest bracket and by having a pin inserted into the upper frame.

A hole is made within the aforementioned attaching portion, and a pin, inserted into the hole, supportingly attaches to the other side of the headrest bracket.

The strength of the upper frame and the side frame unit of the structure is also improved by joining the upper frame to the side frame unit (front panel and/or rear panel).

The free ends of the aforementioned upper frame is formed axially in a flat cylindrical shape, and the cylindrical body is connected to the side frame unit made of front and rear panels making up the side frame.

The strength of the upper frame of the structure is also improved by providing two slits on the upper frame to make the lateral width of the attaching portion smaller, so that the lateral both-end bending deflections of the upper frame become larger, thus minimizing the differences in thickness of the outer diameter.

The strength of the upper frame of the structure is also improved by pressing the attaching portion with a special tool to make the lateral width of the attaching portion smaller, so that the lateral both-end bending deflections of the upper frame are larger and thickness is ensured.

The strength of the upper frame of the structure is also improved by providing two slits on the upper frame to make the lateral width of the attaching portion become smaller, so that the lateral both-end bending deflections of the aforementioned upper frame become larger and thickness is ensured.

The strength of the upper frame and/or headrest bracket of the structure is also improved by having the headrest bracket, the headrest support and the headrest stay rectangularly shaped, and by using the stress caused by the flat area and/or vertical position of the attaching portion.

The aforementioned headrest bracket is formed rectangularly, as seen in the top view, with the rectangular headrest support, as seen in the top view, with a head and leg having been inserted into the rectangular headrest bracket, and with a rectangular-shaped headrest stay, as seen in the cross-sectional view, having been inserted into rectangular-shaped through-hole, as seen in the top view, and provided on the headrest support.

The strength of the upper frame and/or headrest bracket of the structure is also improved by joining the headrest bracket to the upper frame and/or by using the stress of the flat area and/or vertical position of the attaching portion.

The upper and lower ends of the aforementioned half cut-out portions of the pipe are curved, with the mid-section having been vertically formed.

The strength of the side frame unit of the structure is also improved by caulking the side frame unit made of two panels and by engaging the holes and ribs of the two panels.

The aforementioned side frame unit is made of a joined structure of at least two panels, with the joint of the two panels having been formed by engaging the holes and ribs and then having the holes and ribs caulking-fixed.

The upper frame unit made of front and rear panels is connected to the side frame unit, thus improving the connection of the upper frame unit and side frame unit, thus strengthening the seatback frame and/or the headrest bracket.

The aforementioned upper frame unit is a joined structure made of at least front and rear panels, with a rectangular through-hole formed thereon, with the through-hole having been formed within the headrest bracket, and the wall surface of the though-hole and both sides of the headrest bracket having been welded.

The strength of the upper frame unit of the structure is also improved by caulking the upper frame unit made of at least front and rear panels and by engaging the holes and ribs of the two panels.

The upper frame is a united structure made of at least front and rear panels joined by engaging the holes and ribs. Some of the holes and ribs are positioned. Other holes and ribs are caulking-fixed.

The strength of the upper frame unit of the structure is also improved by including a through-hole formed on the upper frame unit, with the headrest bracket inserted into the through-hole, so that the lateral both-end bending deflections of the upper frame become larger and thickness is ensured.

A through-hole is formed on the aforementioned upper frame unit, with the headrest bracket inserted into the though-hole, so that the lateral both-end bending deflections of the upper frame become larger.

BRIEF DESCRIPTION OF THE DRAWINGS

FIG. 3-1 shows the relationship between the seat and the crash test dummy (full-scale anthropomorphic test device: ATD) on a normal basis.

FIG. 3-2 shows the relationship between the seat and the ATD in a forward vehicle collision. The headrest is in the normal position, but the seatback is distorted, and the head of the ATD is whipped (forward) in the direction of travel.

FIG. 3-3 shows the relationship between the seat and the ATD in a rear vehicle collision. The head of the ATD is protected from whiplash by the headrest.

FIG. 4-1 is a perspective view showing the attaching portion being made by the squeeze-pressing process, together with the attaching walls in regular shape emphasizing the strength and showing the bracket (headrest bracket) being attached to the attaching portion of the upper frame.

FIG. 4-2 is a perspective view showing the attaching portion being made by the squeeze-pressing process together with attaching walls of a different shape to realize high productivity and to simplify the welding process, and showing the bracket (headrest bracket) being attached to the attaching portion of the upper frame.

FIG. 5-1 is a top view showing the bracket now attached to the upper frame, as shown in FIG. 4-1.

FIG. 5-2 is a top view showing the bracket now attached to the upper frame, as shown in FIG. 4-2.

FIG. 6-1 is a partially-omitted rear view showing the bracket attached to the attaching portion of the upper frame, as shown in FIG. 4-1, and showing Pipe Diameter D1 of the curved portion of the upper frame as being nearly equal to Pipe Diameter D0, beneath, and of Pipe Thickness t1 of the curved portion as being nearly equal to Pipe Thickness t0, beneath, and that Bending radius R is larger.

FIG. 6-1-1 is a partially-omitted rear view of another example showing the bracket attached to the attaching portion of the upper frame, as shown in FIG. 4-1, and showing Pipe Diameter D1 of the curved portion of the upper frame as being closely similar (deemed identical) to Pipe Diameter D0 beneath, and of Pipe Thickness t1 of the curved portion as being similar to Pipe Thickness t0, beneath, and that Bending radius R is much larger.

Figure 1:
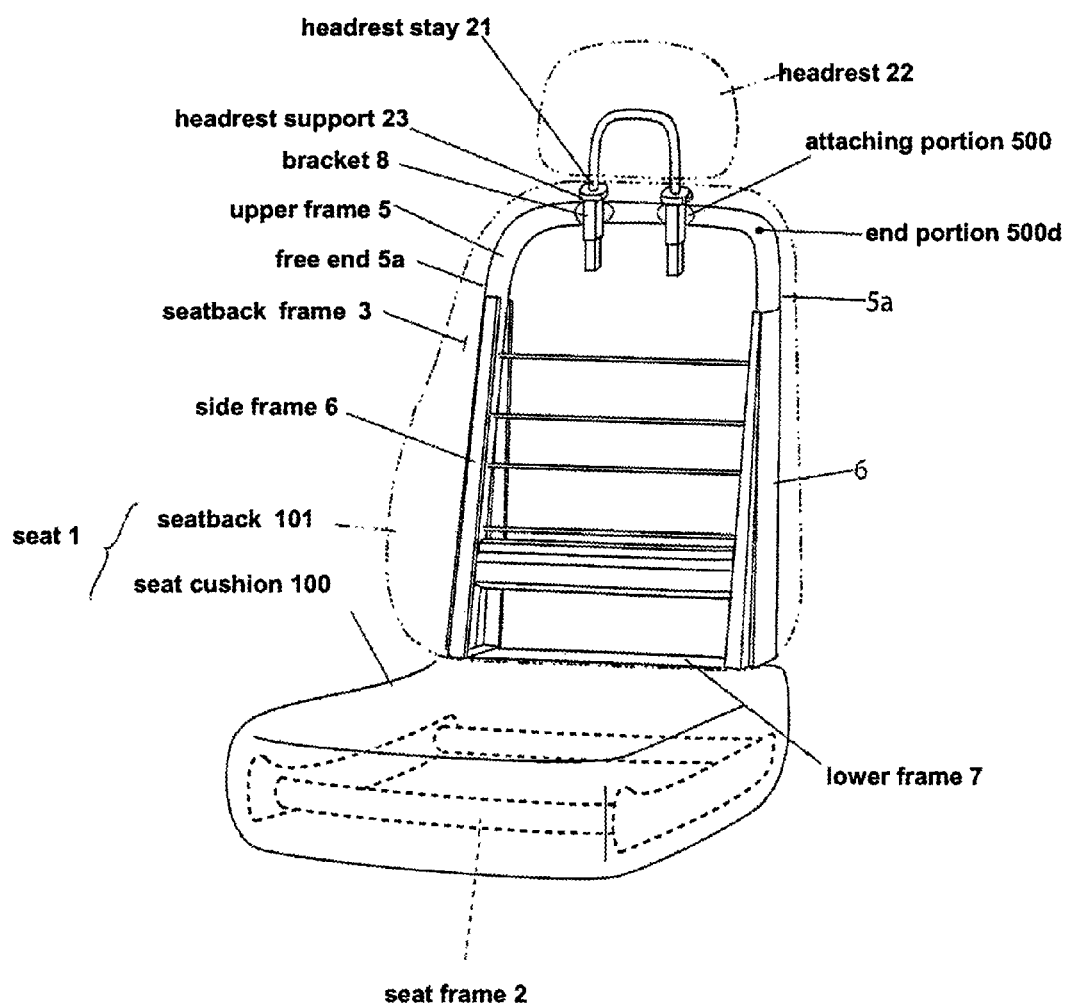
FIG. 1 is a reduced-perspective view of the entire structure of the vehicle seat.
Figure 2:
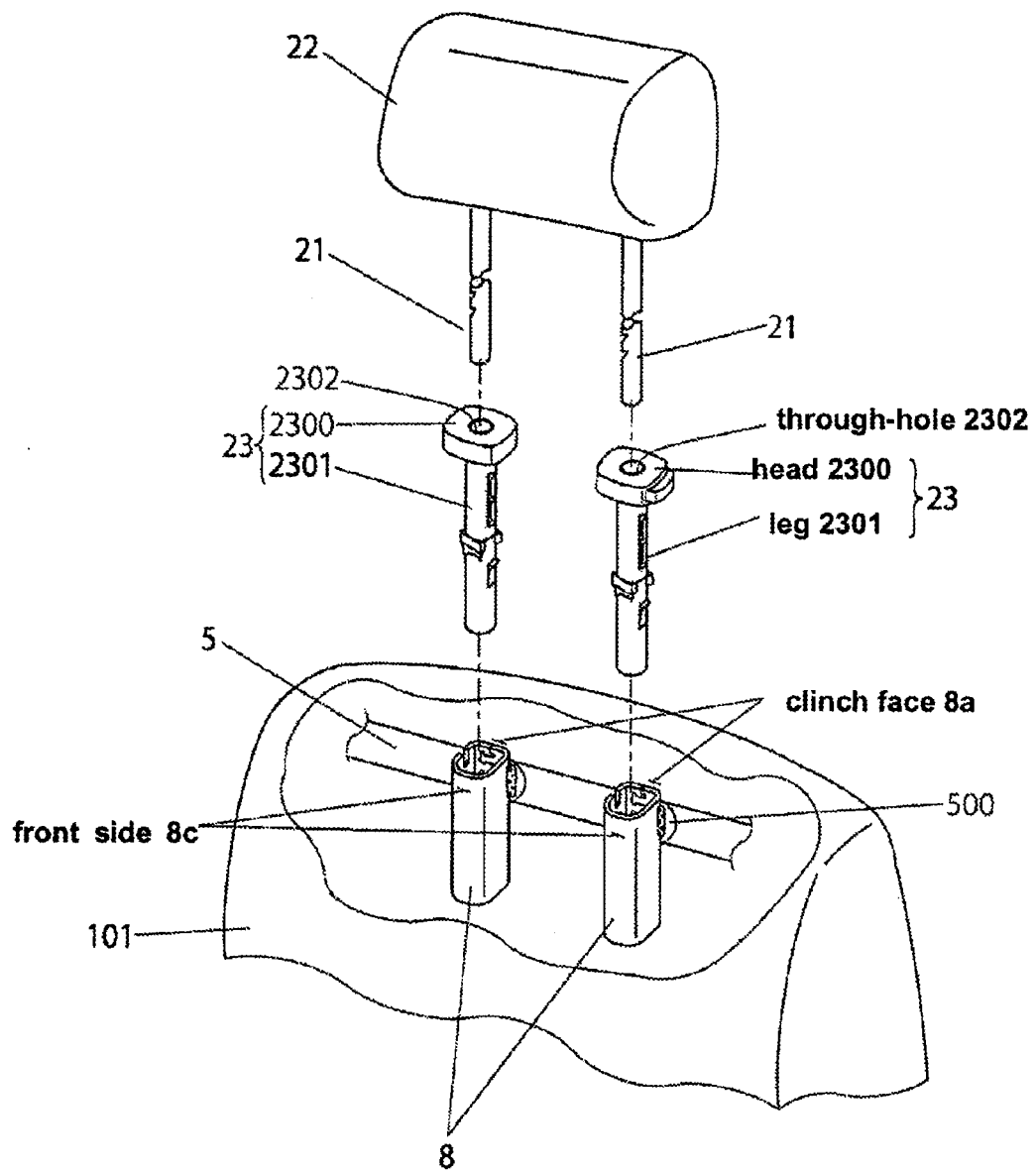
FIG. 2 is a partially-omitted perspective view showing the relationship between the seatback and the headrest device.
Figures 1, 4:
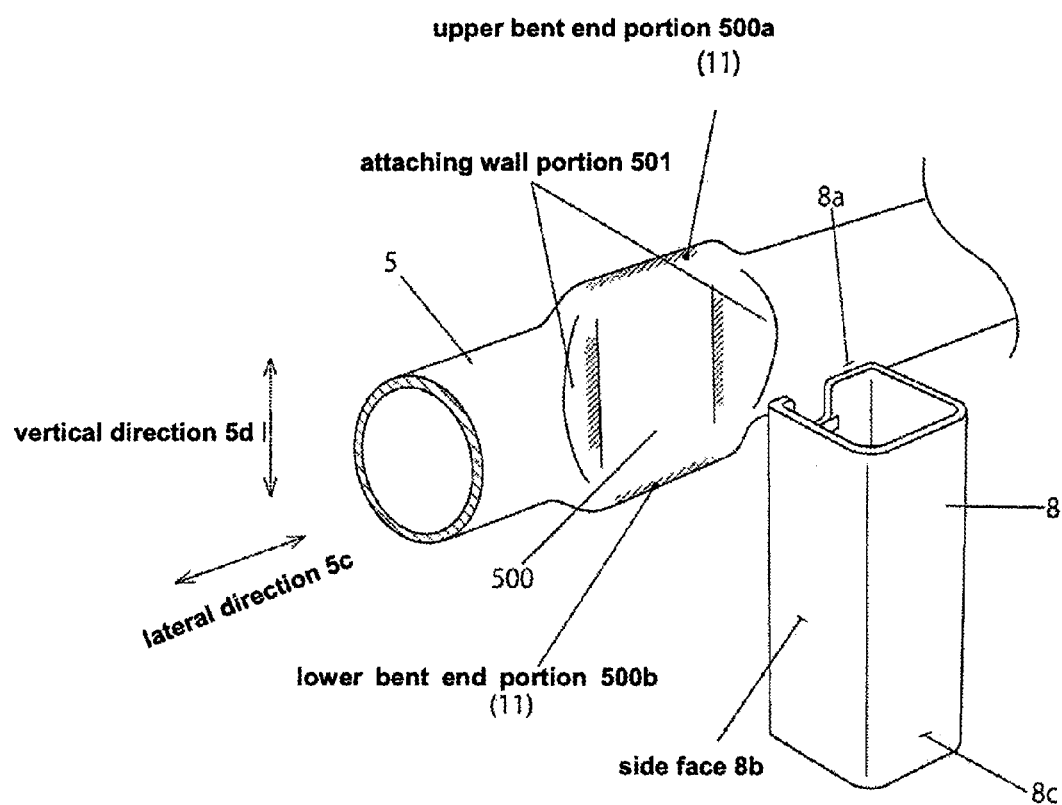
Figures 2, 4:
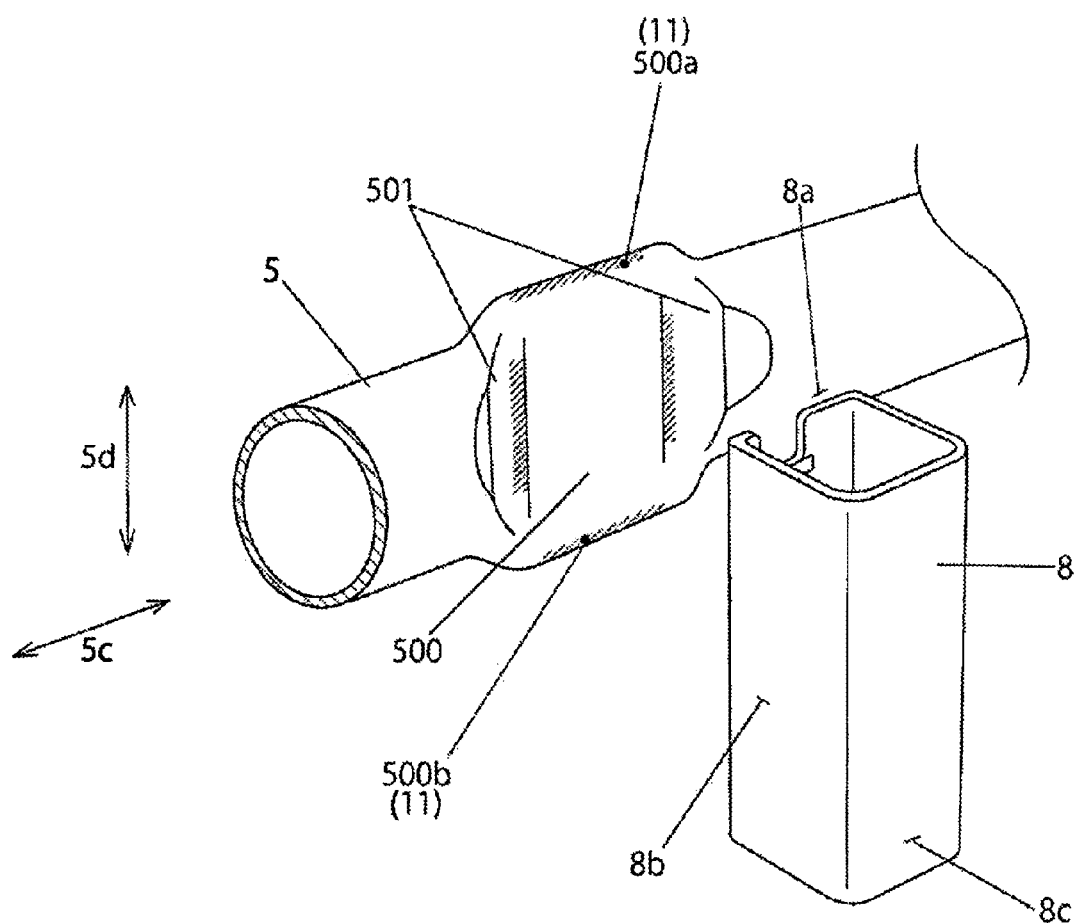
Figures 1, 6:
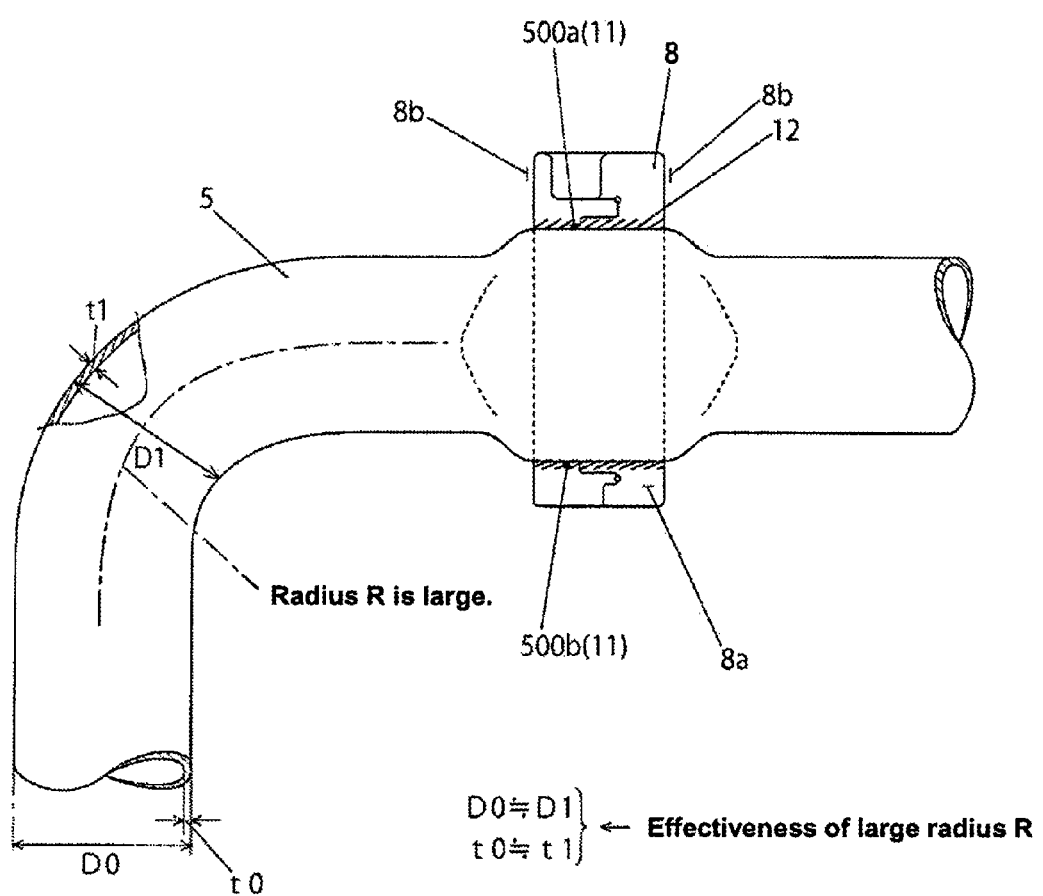
Figures 1, 6:
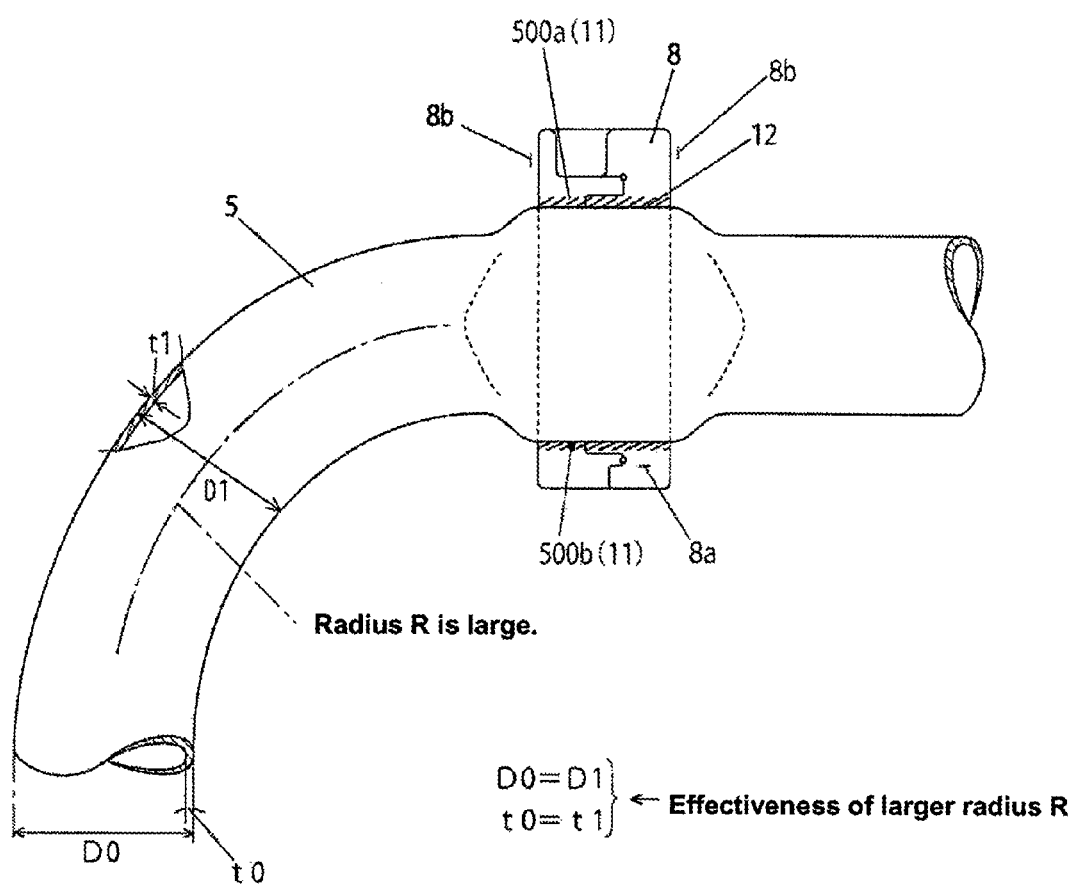
Figures 1, 2, 6:
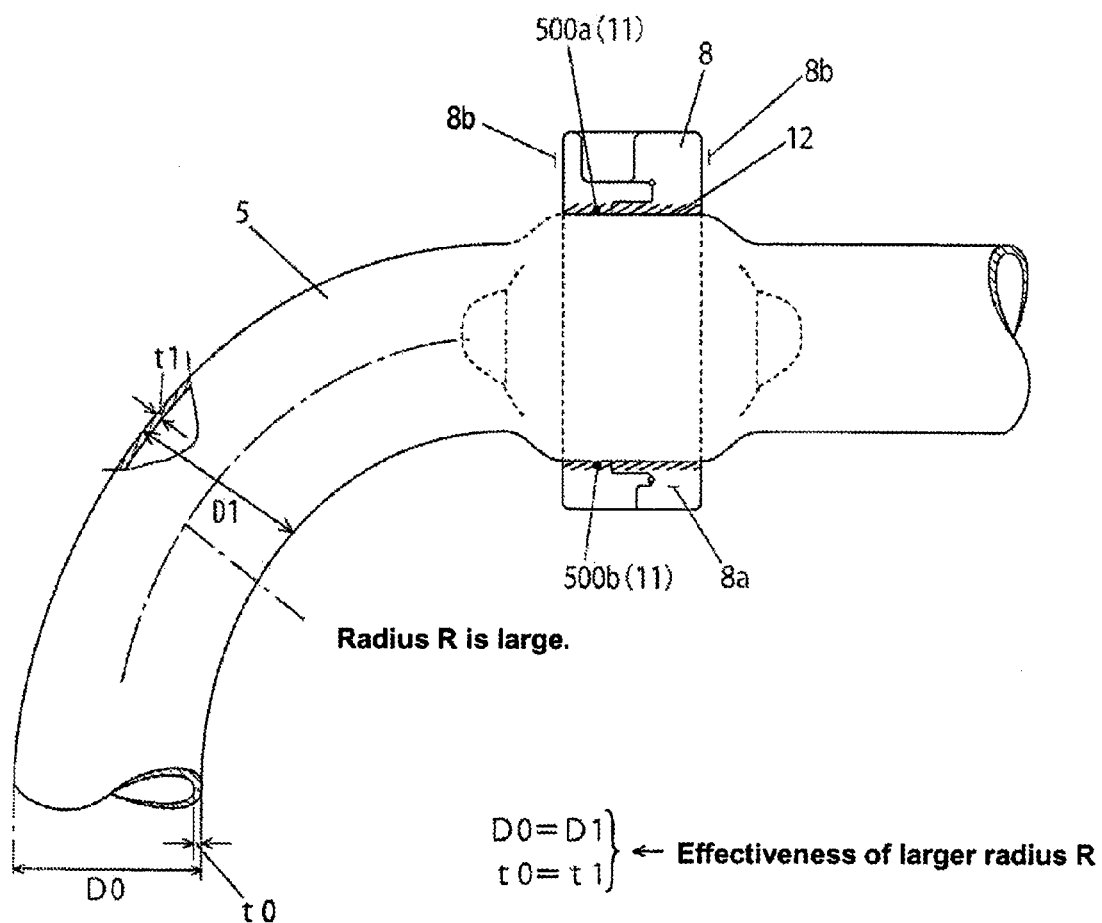

FIG. 6-2 is a partially-omitted rear view (based on FIG. 6-1) showing the bracket attached to the attaching portion of the upper frame, as shown in FIG. 4-2.

FIG. 6-2-1 is a partially-omitted rear view (based on FIG. 6-1-1) showing the bracket attached to the attaching portion of the upper frame, as shown in FIG. 4-2.

Figures 1, 7:
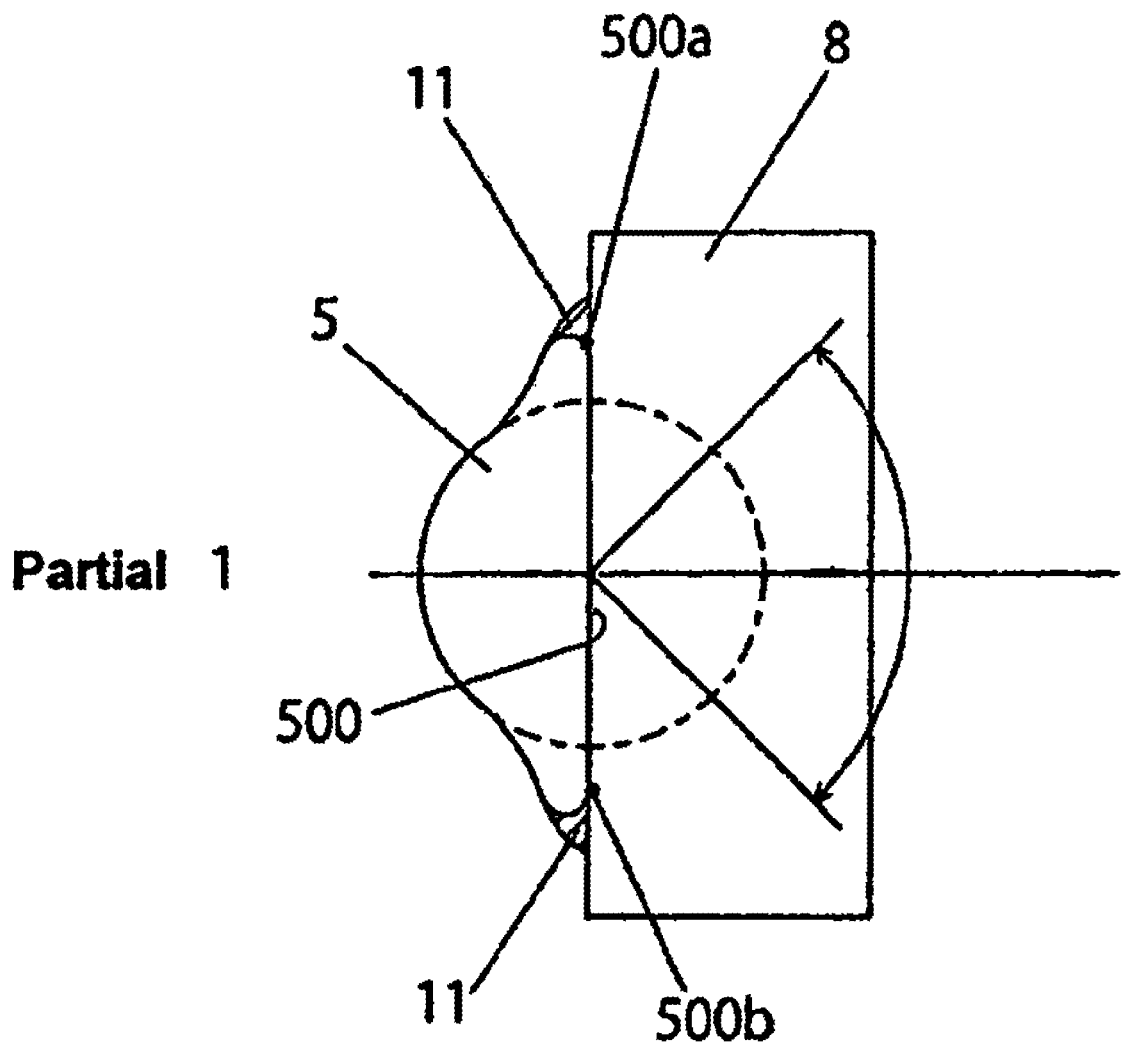
Figures 3, 7:
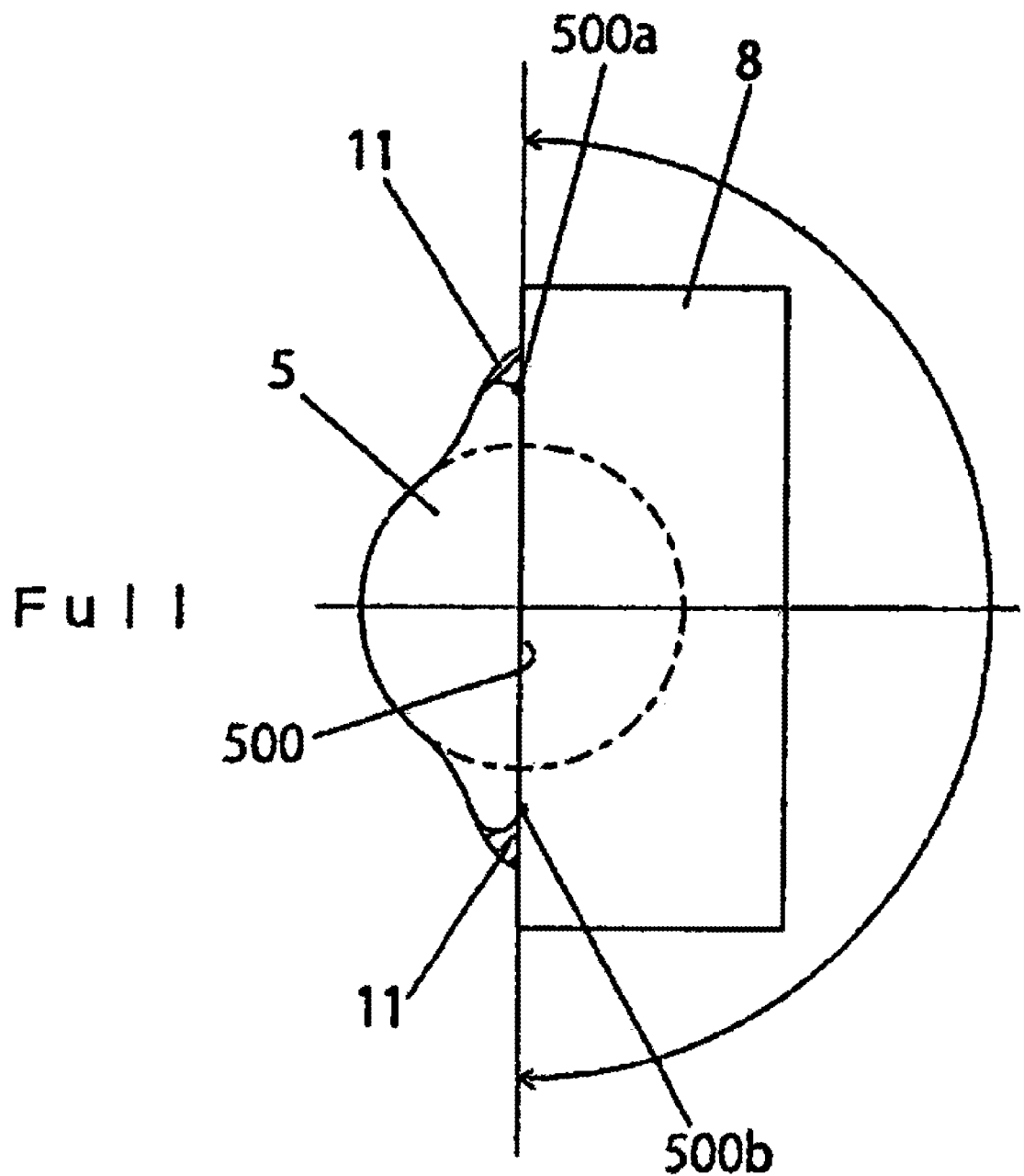

FIG. 7-1 is an illustration (partial 1) showing the welding angle (90 degrees) between the attaching portion of the upper frame and the bracket, being least and most economical, yet realizing a certain degree of strength.

FIG. 7-2 is an illustration (partial 2) showing the welding angle (135 degrees) between the attaching portion of the upper frame and the bracket, being medium and practically usable.

Figures 1, 3:
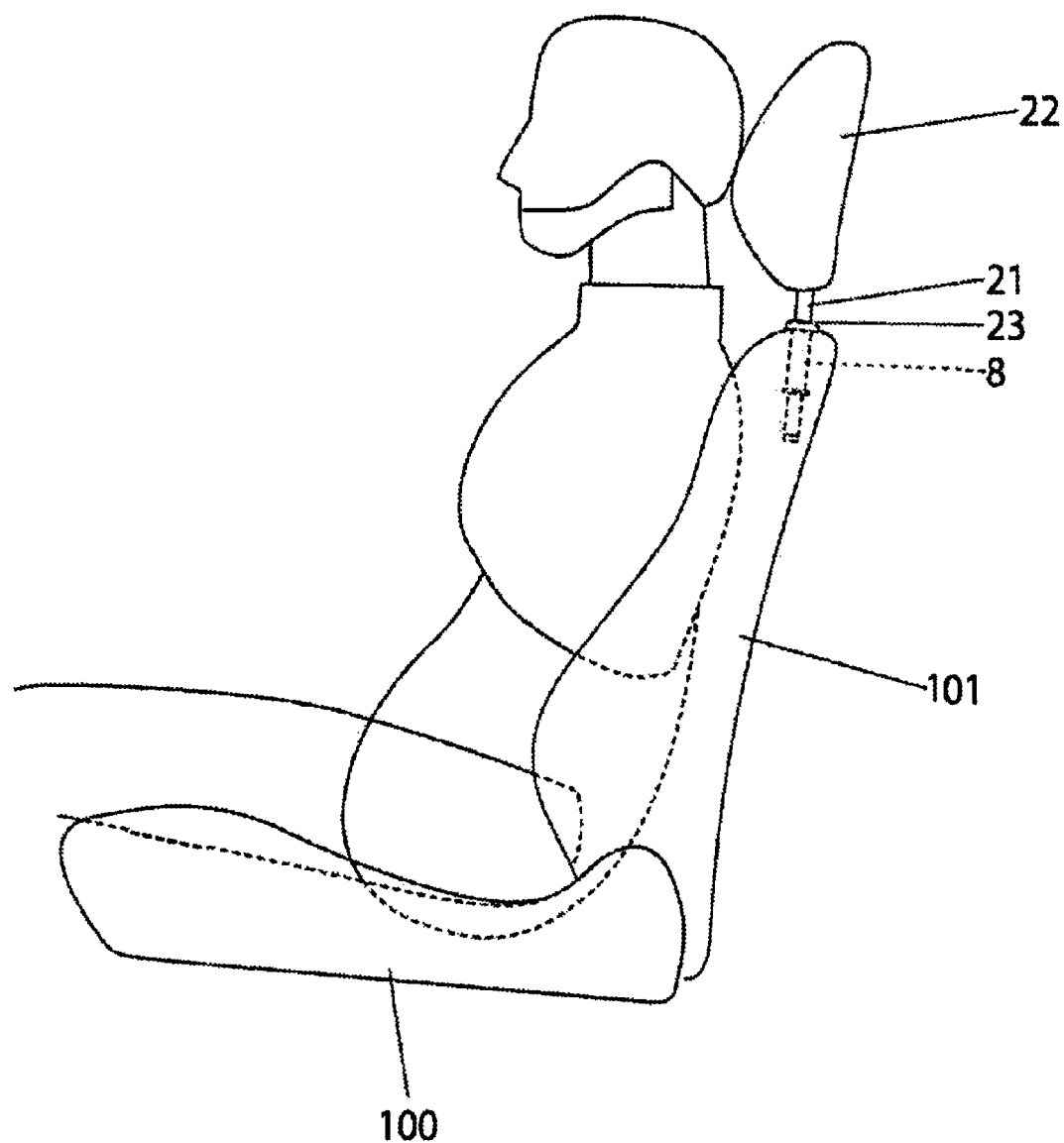
Figures 2, 3:
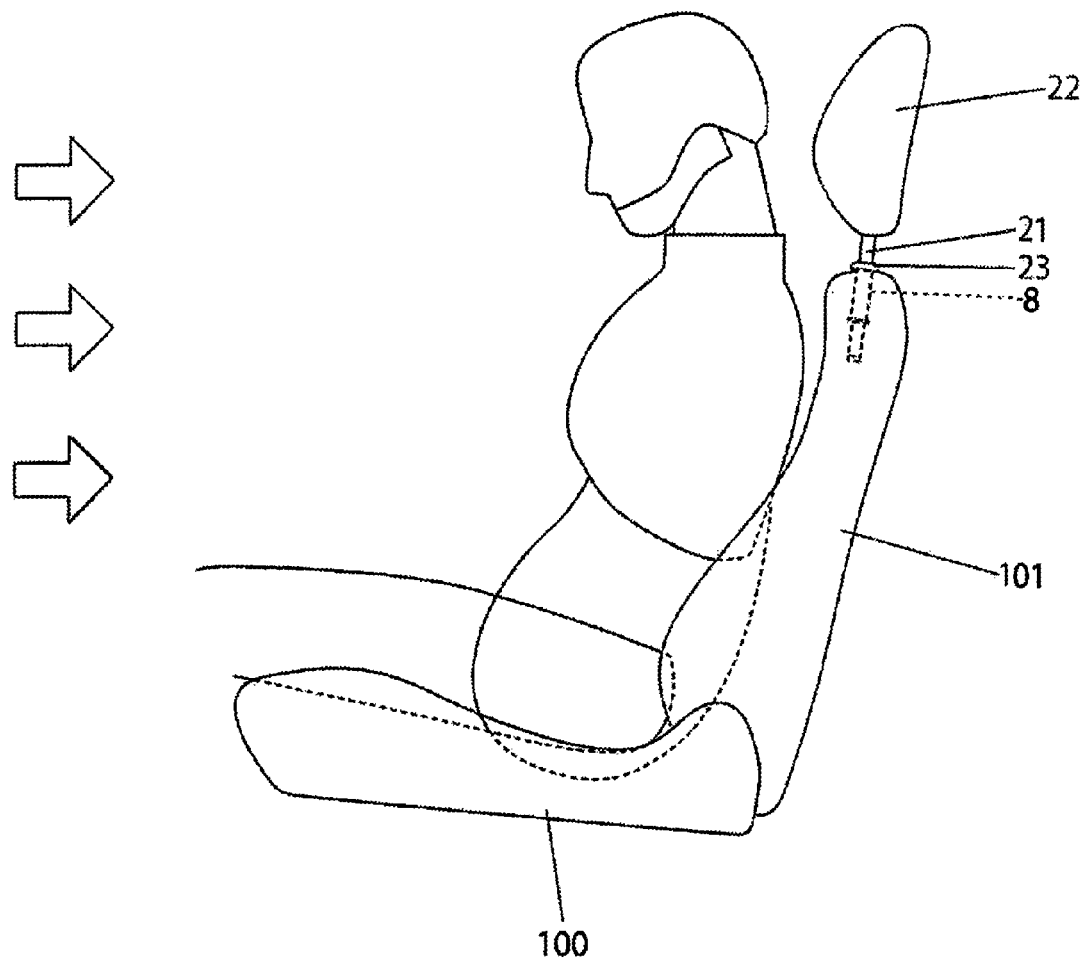
Figure 3:
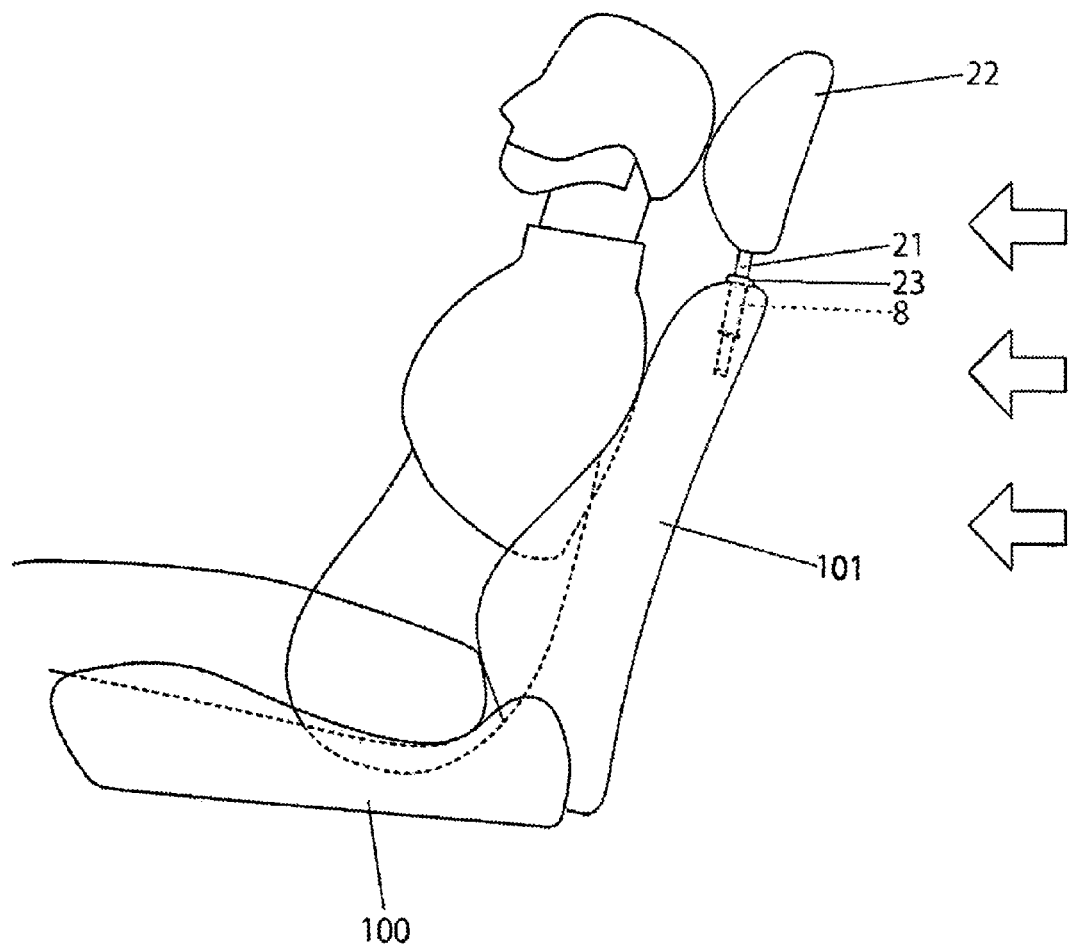

FIG. 7-3 is an illustration (full) showing the welding angle (180 degrees) between the attaching portion of the upper frame and the bracket, being greatest, thus making it possible to weld about half the width of the diameter of the pipe to the upper frame. In addition, another nearly half the width of the diameter of the pipe of the attaching portion can be welded, thus strengthening the upper frame. However, it is still necessary to improve economic efficiency.

FIG. 7-4 is a chart showing the relationship between the cost of welding and the strength of the welds in connection with FIGS. 7-1 to 7-3. There is not much difference in cost and strength between FIGS. 7-1 to 7-3, unless the diameter and thickness of the pipe of the upper frame, as shown in FIGS. 6-1 to 6-2-1, are ensured. In either case, strength can be ensured if the welded portion (length of bead) of the upper frame and bracket is near the circumference trajectory (surface) of the round pipe.

Figure 8:
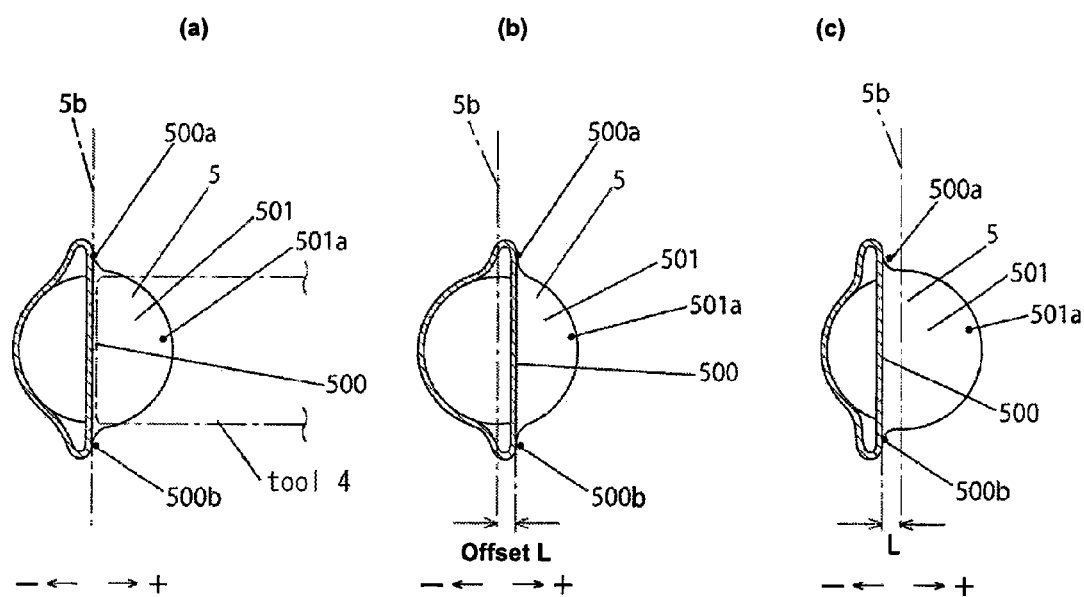

FIG. 8 shows examples of the attaching portion of the upper frame. Example (a) is the end view of the upper frame which has been pressed in the center (offset L). Example (b) is the end view of the upper frame which has been pressed approximately 3 mm ahead of center. Example (c) is the end view of the upper frame which has been pressed approximately 3 mm behind center. These examples have been arbitrarily chosen.

Figures 1, 9:
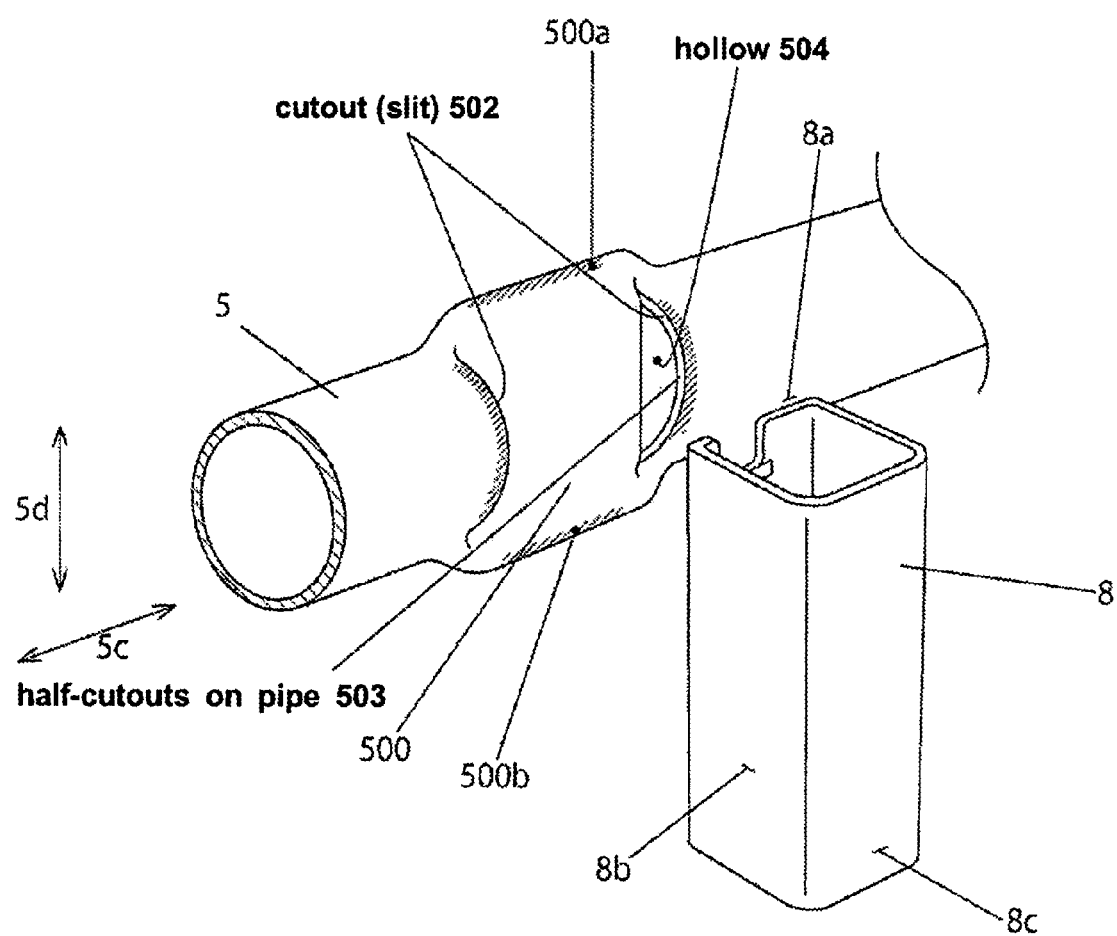
Figures 2, 9:
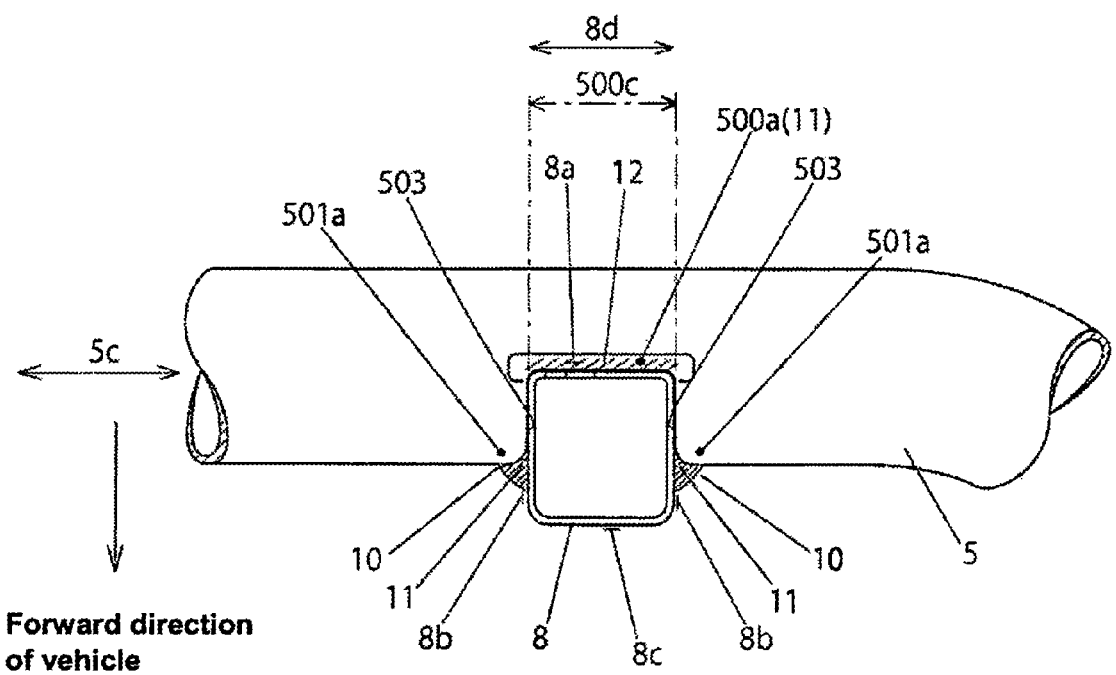
Figures 3, 9:
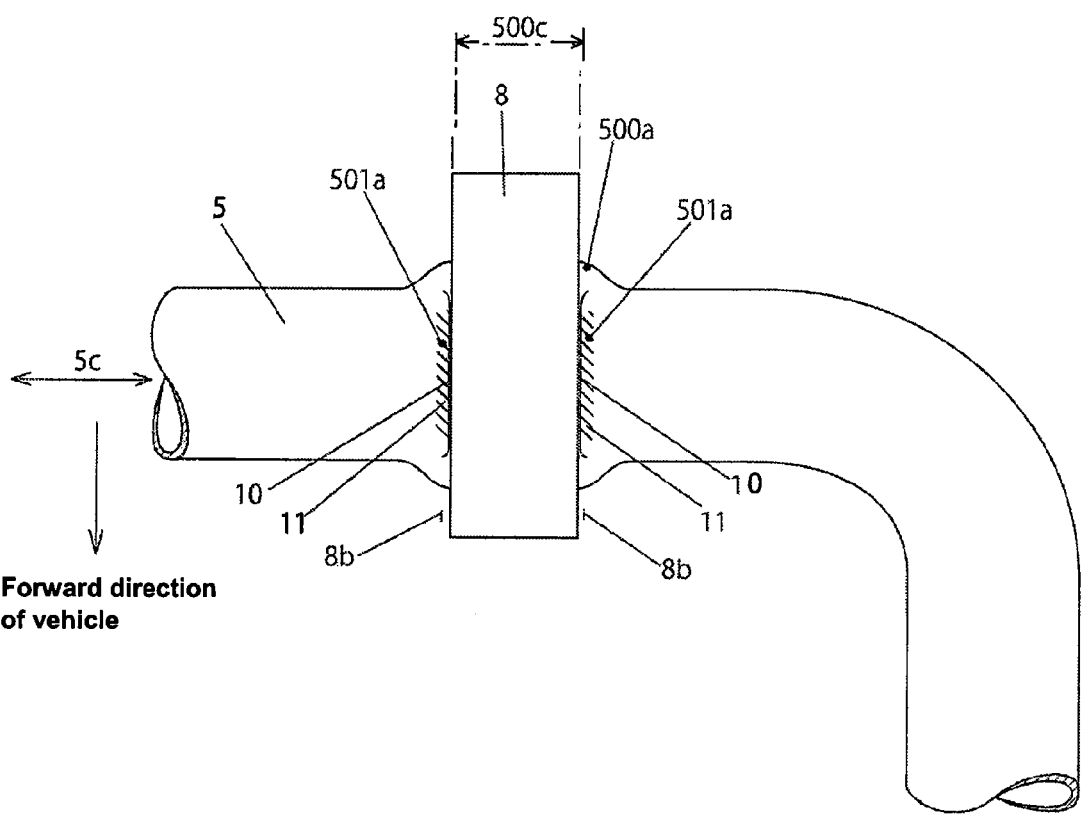
Figures 4, 9:
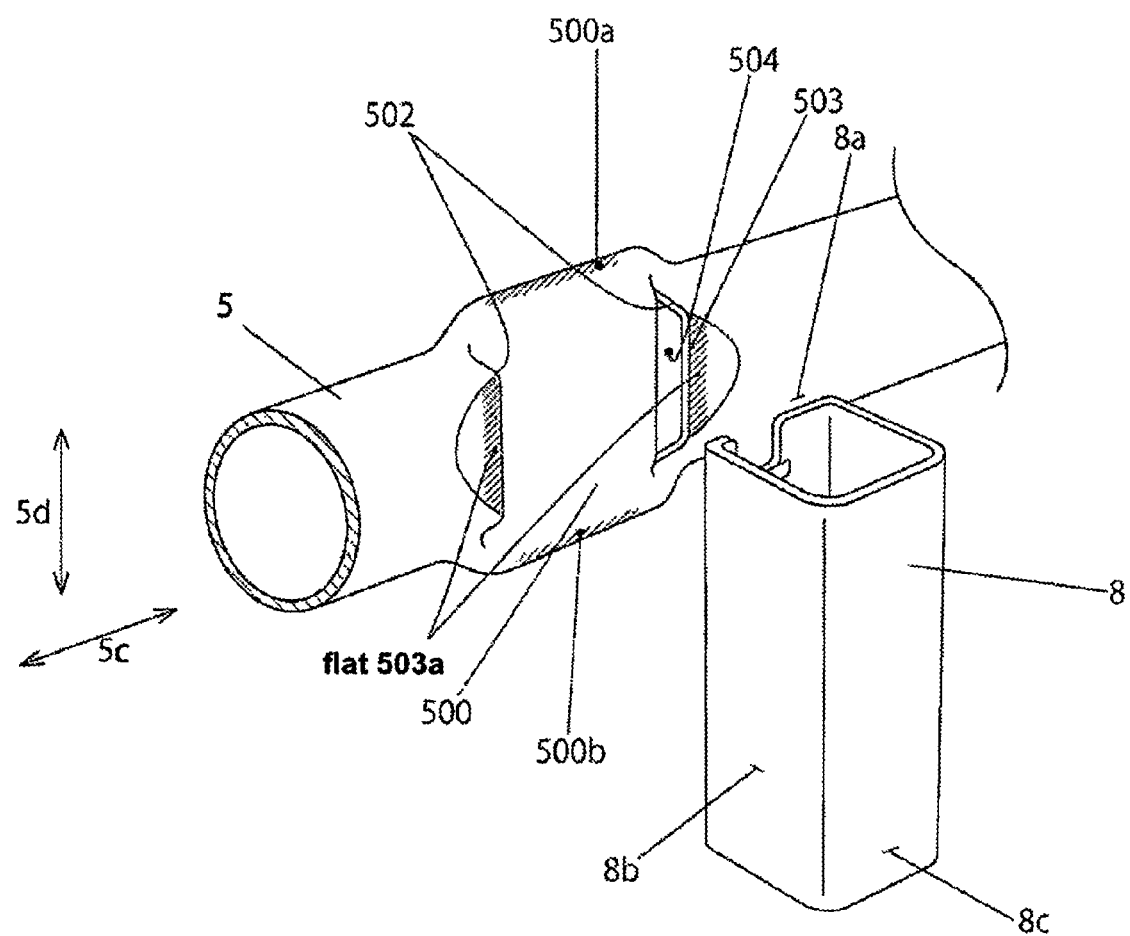
Figures 6, 9:
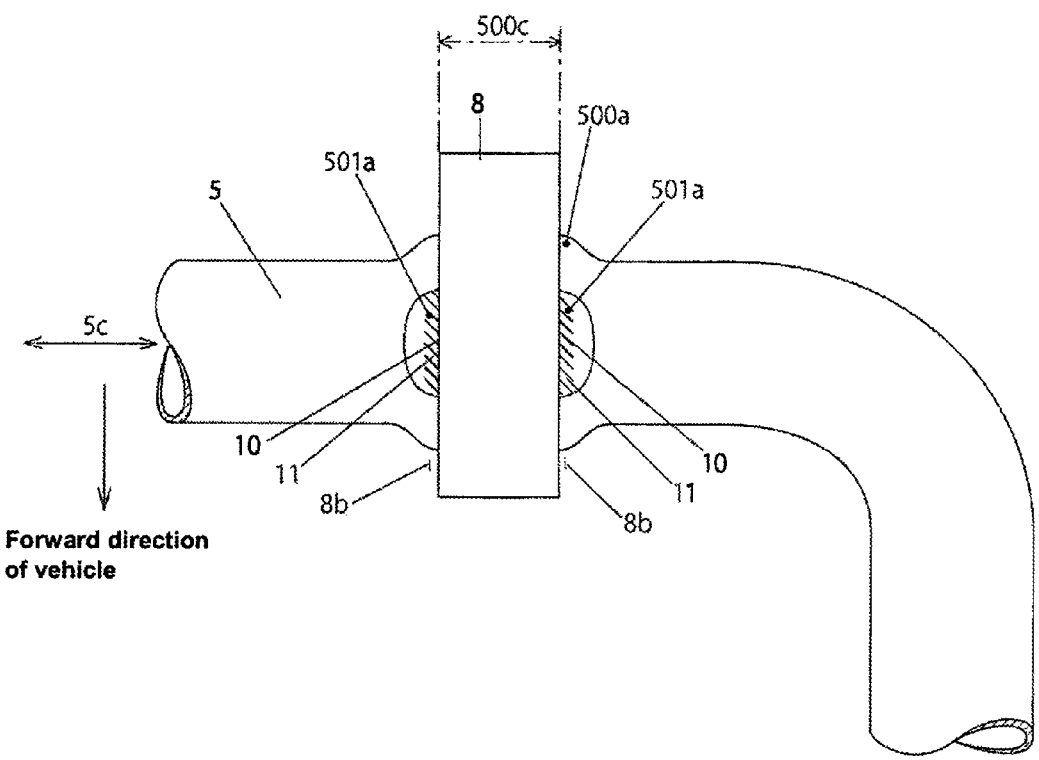
Figures 1, 6, 9:
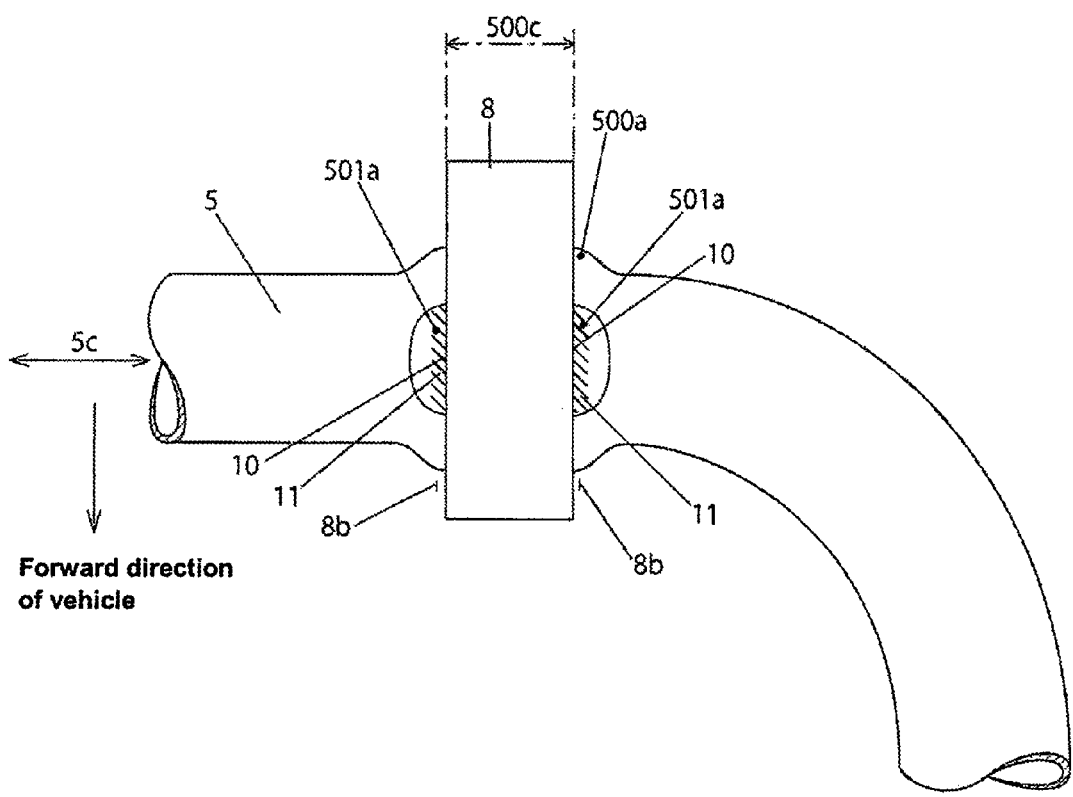

FIG. 9-1 is a perspective view showing an example of the attaching portion having been formed by providing two slits on the upper frame and of the bracket about to be attached to the attaching portion.

FIG. 9-2 is a top view of FIG. 9-1.

FIG. 9-3 is a top view of FIG. 9-1.

FIG. 9-3-1 is a frontal view showing the bracket now attached to the attaching portion of the upper frame, as shown in FIG. 9-1. Compared to FIG. 9-3, bending radius R is greater.

FIG. 9-4 is a perspective view showing another example of the attaching portion having been formed by providing two slits on the upper frame and of a bracket having been attached to the attaching portion.

Figures 1, 5:
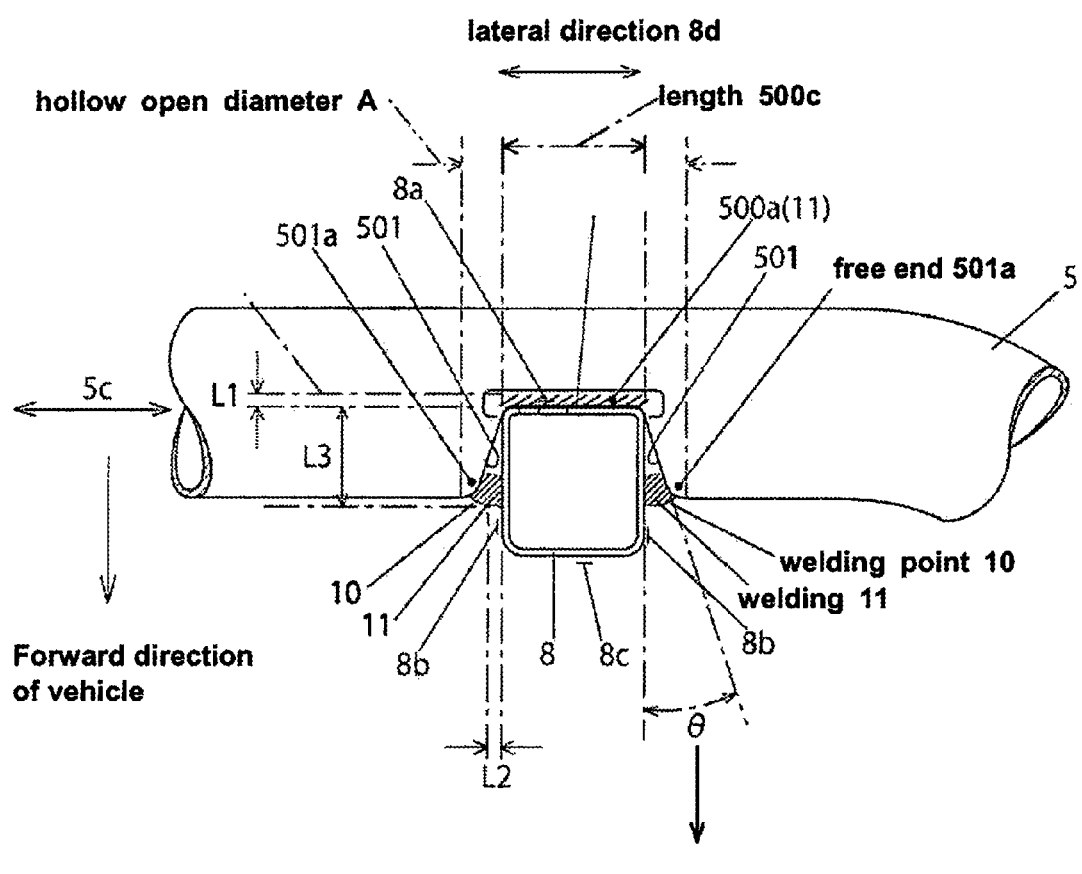
Figures 2, 5:
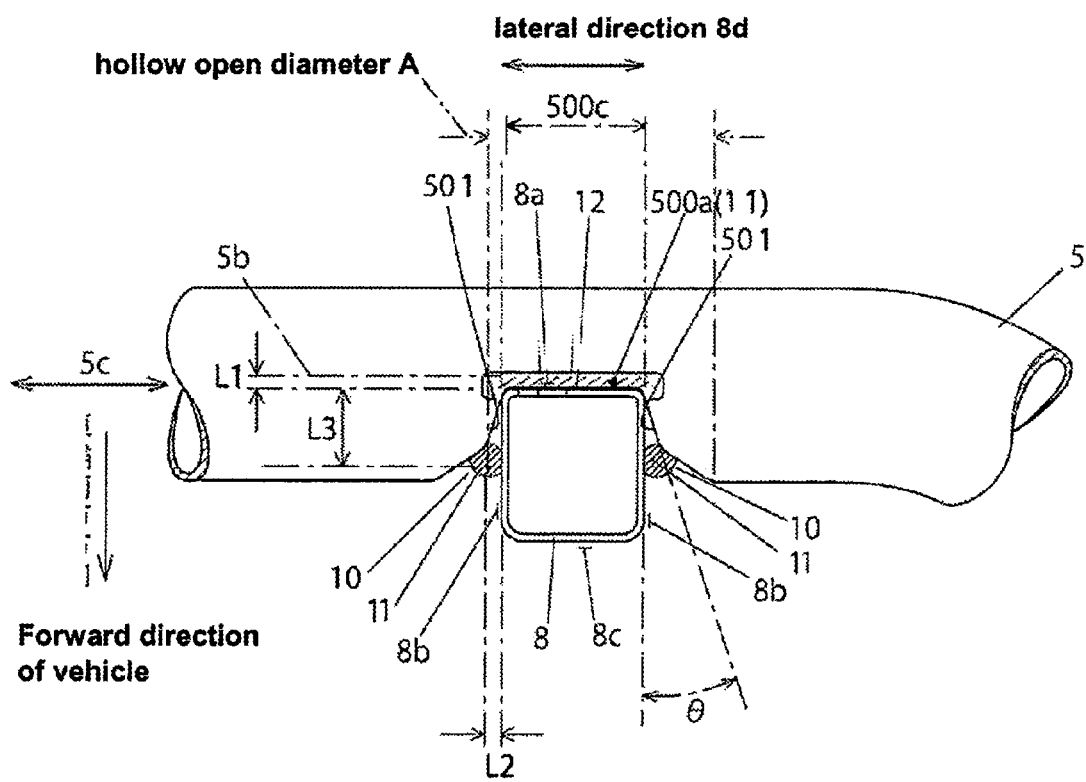

FIG. 9-5 is a top view of FIG. 9-4.

FIG. 9-6 is a frontal view of FIG. 9-4.

FIG. 9-6-1 is a frontal view showing still another example of the bracket having been attached to the attaching portion of the upper frame, as shown in FIG. 9-4. Compared to FIG. 9-6, bending radius R is greater.

Figures 1, 10:
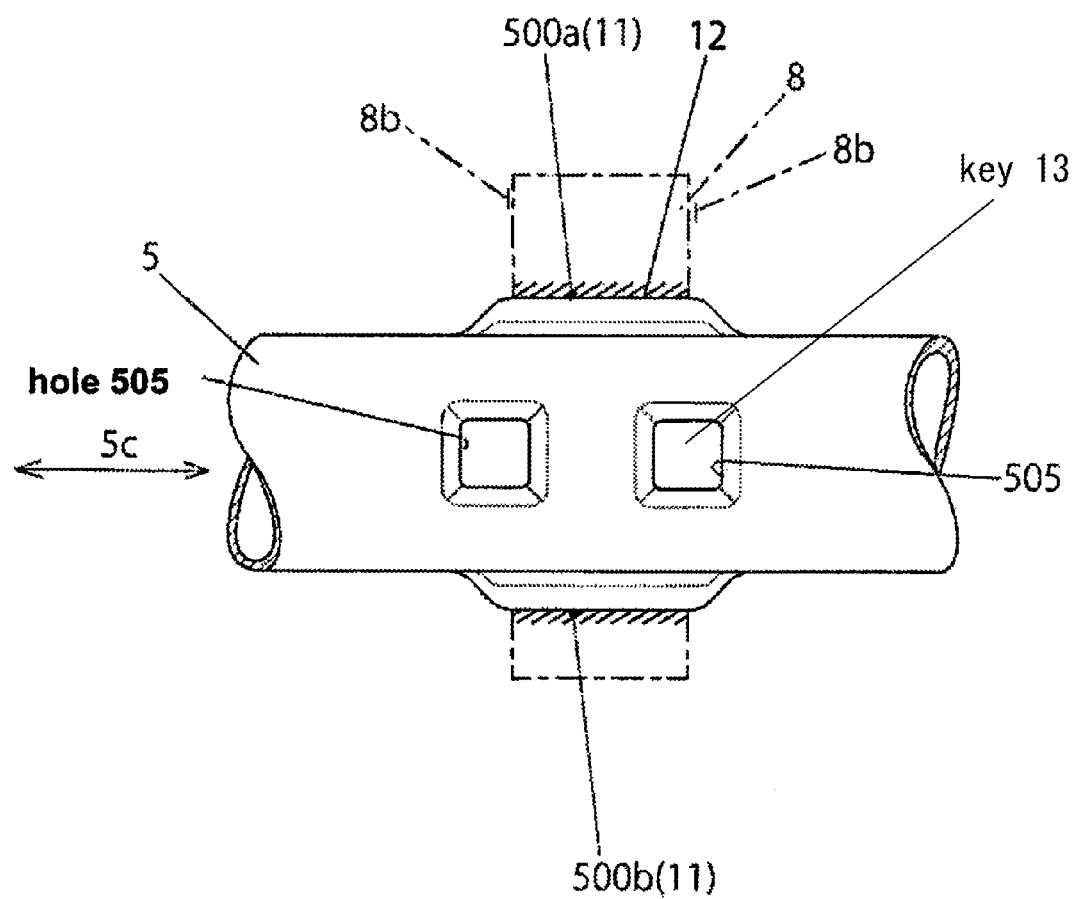

FIG. 10-1 is a rear view showing the increased strength of the bracket by synergistic effect, in that a pin is inserted into the upper frame to contact and support the side of the bracket, in addition to the bracket being welded to the upper frame.

FIG. 10-2 is a cross-sectional view of FIG. 10-1, showing the tool which is used to insert the pin, as shown in FIG. 10-1.

Figures 1, 11:
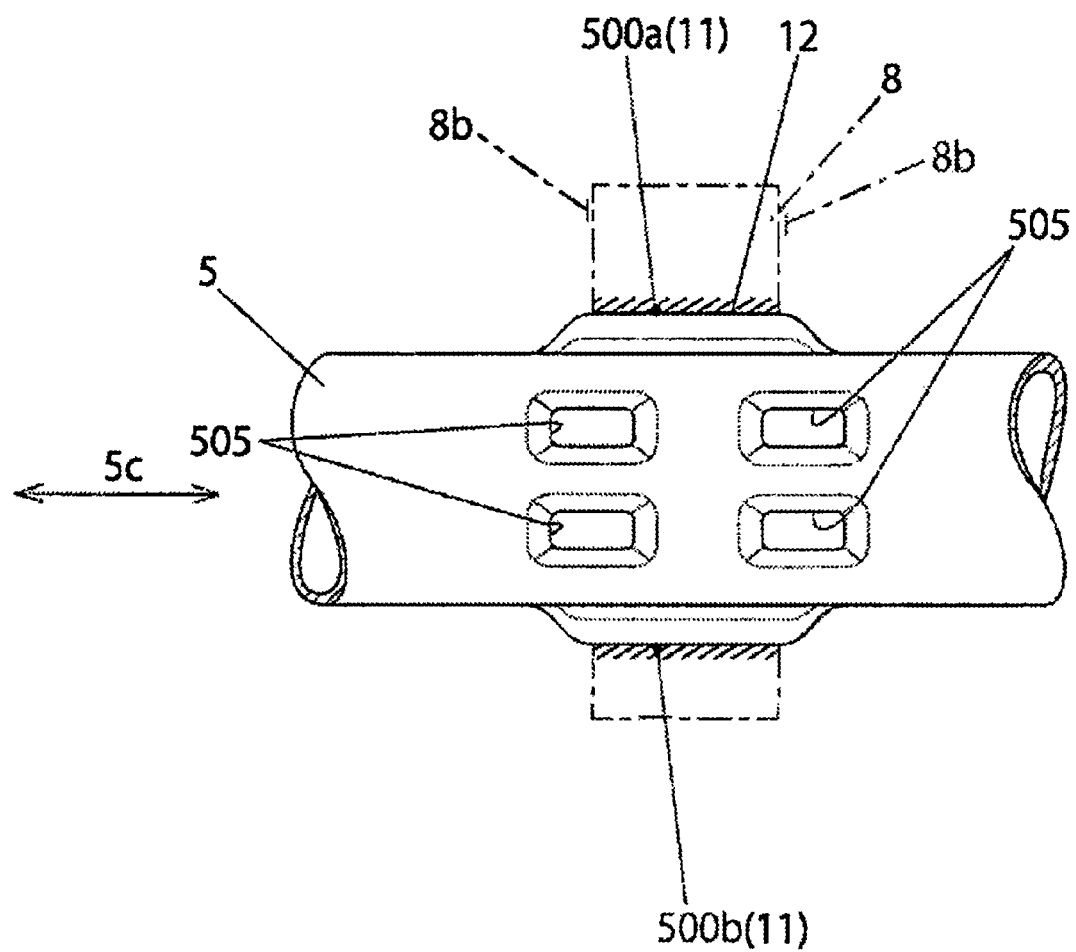
Figures 2, 11:
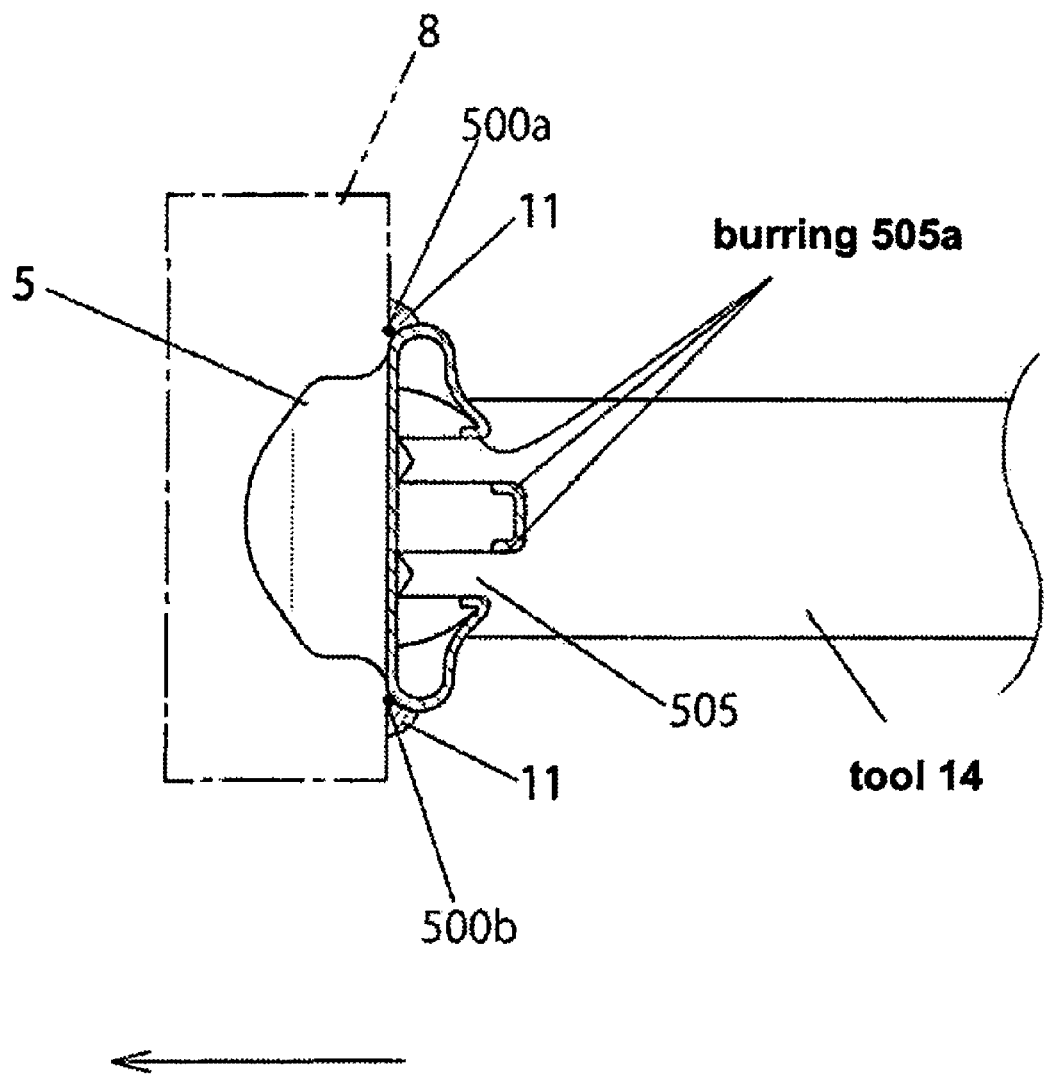
Figures 3, 11:
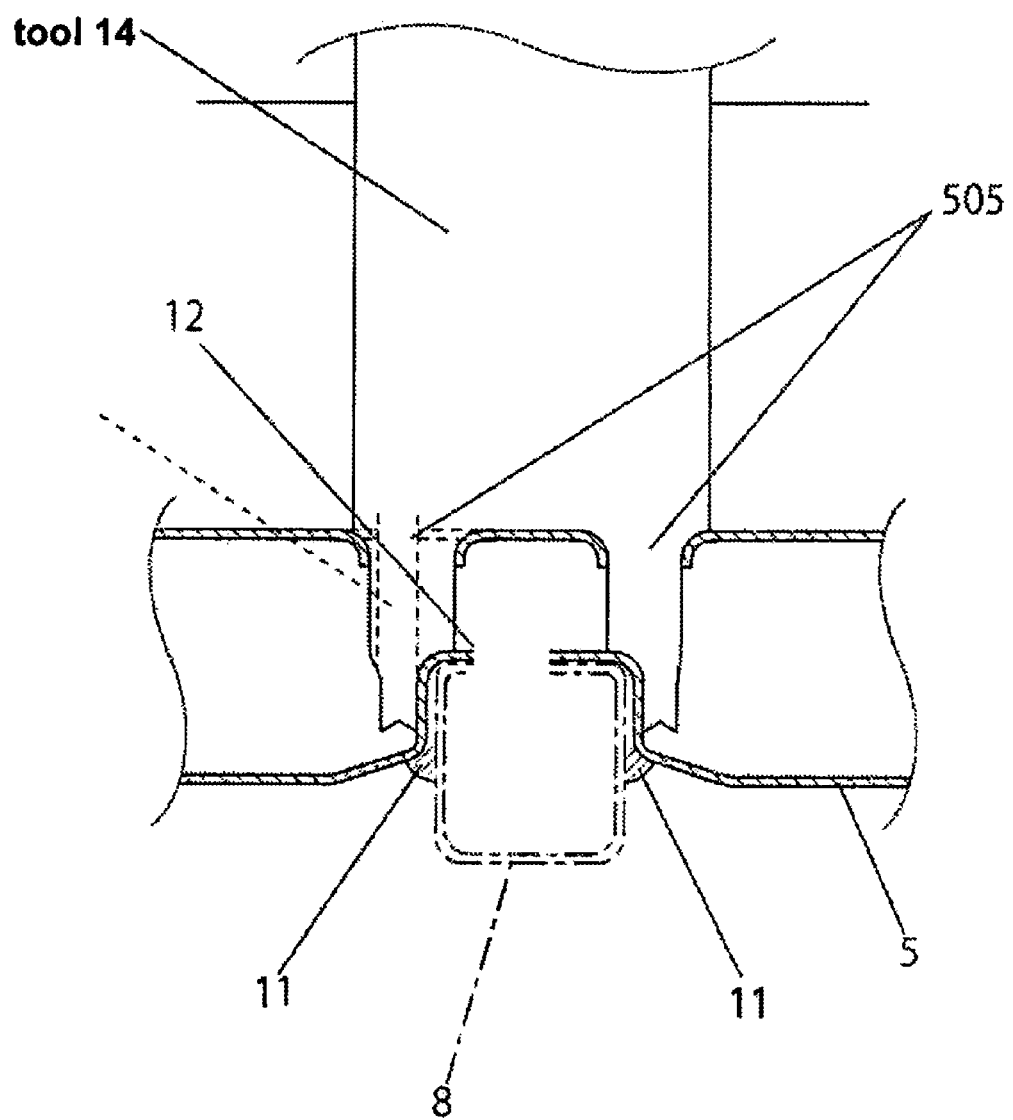

FIG. 11-1 is a rear view showing the increased strength of the bracket by synergistic effect, in that two pins are inserted into the upper frame to contact and support the side of the bracket, in addition to the bracket being welded to the upper frame.

FIG. 11-2 is a lateral view of FIG. 11-1, showing the tool which is used to insert the pin, as shown in FIG. 11-1.

FIG. 11-3 is a top view of FIG. 11-1, showing the tool which is used to insert the pin, as shown in FIG. 11-1.

Figures 1, 12:
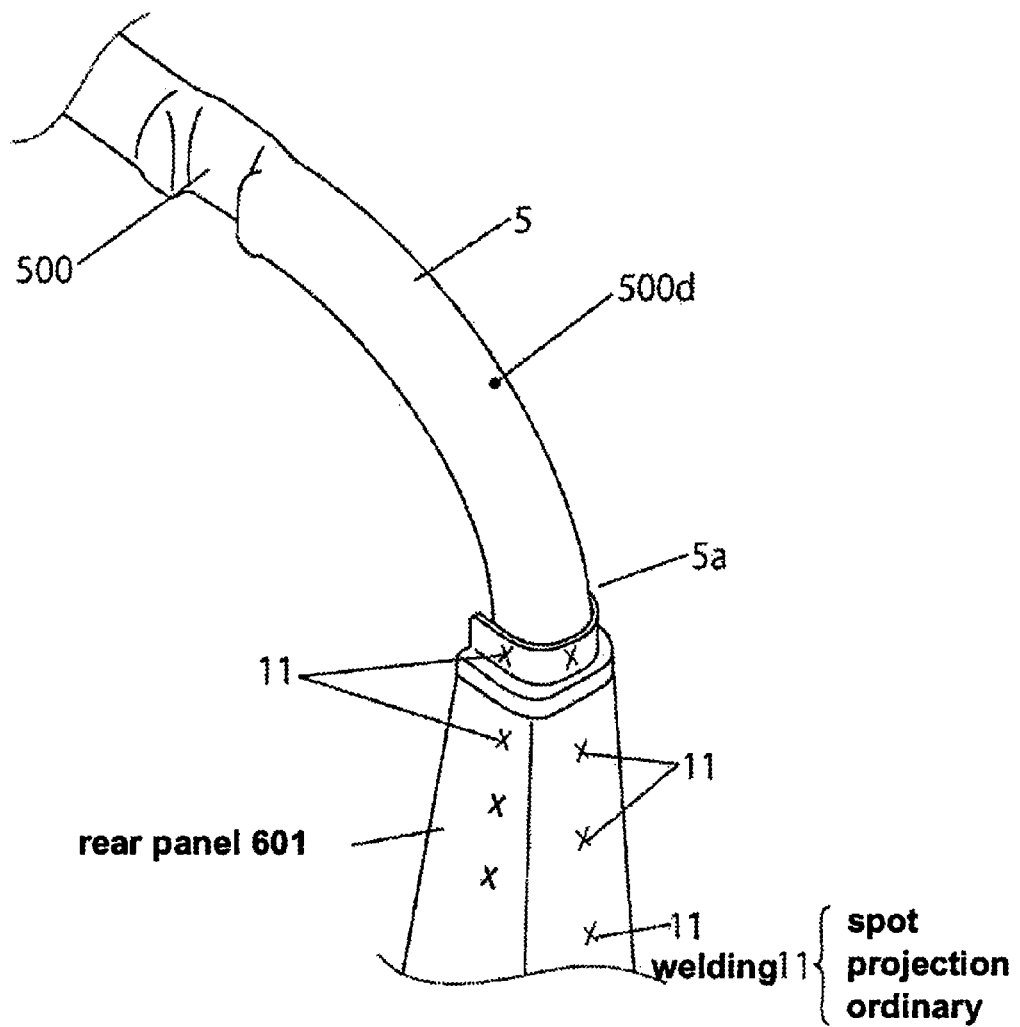
Figures 2, 12:
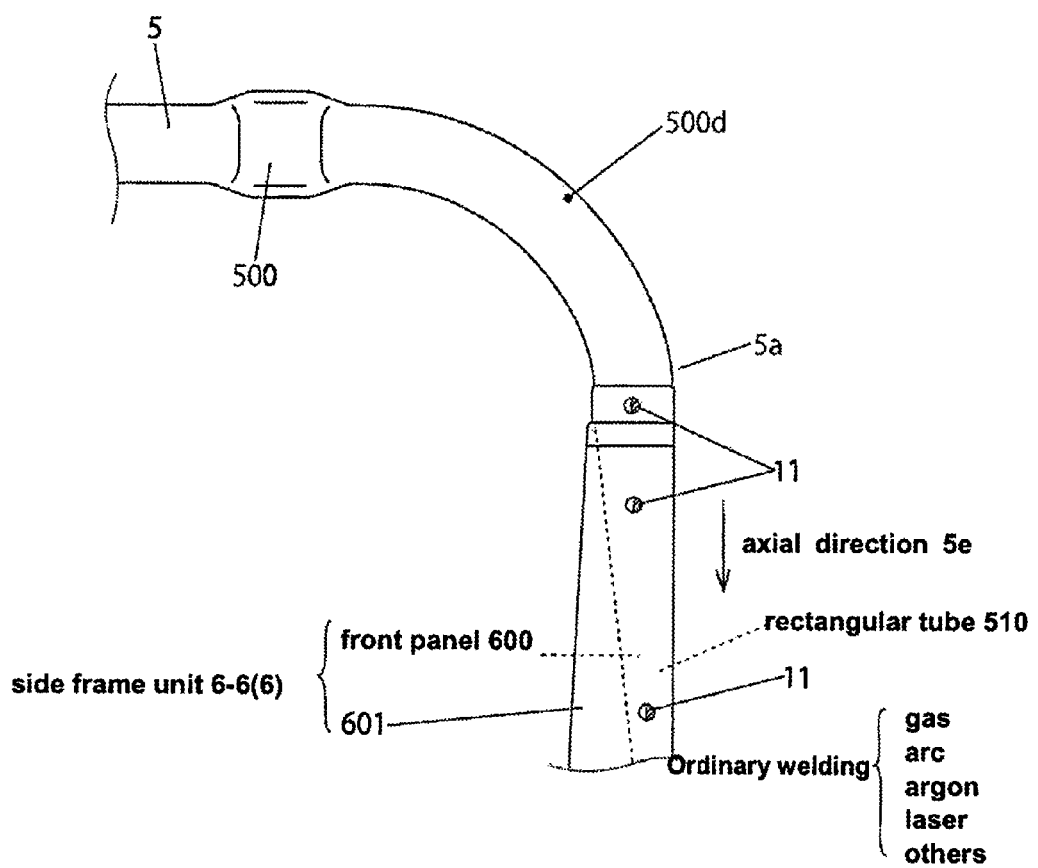
Figures 1, 2, 12:
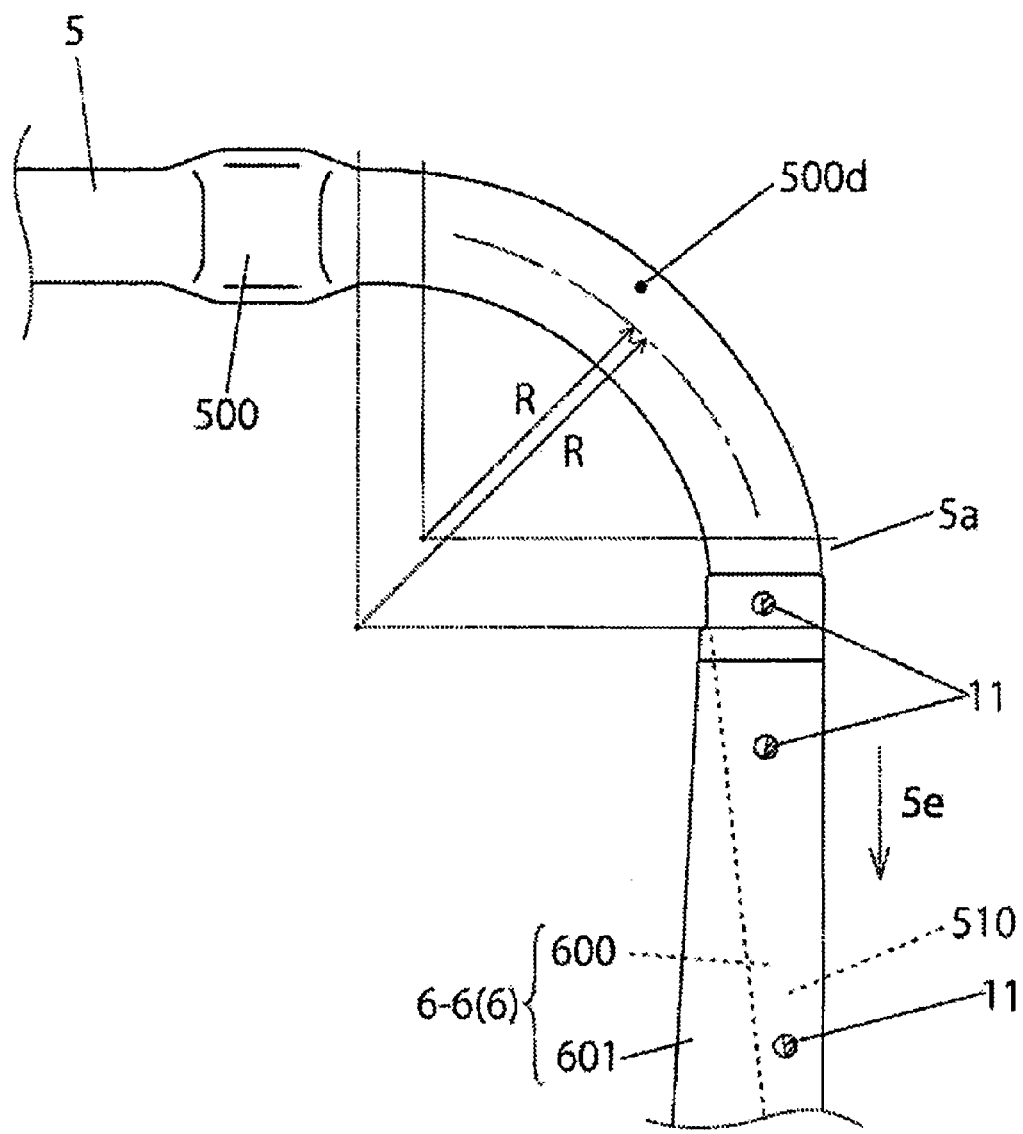
Figures 2, 12:
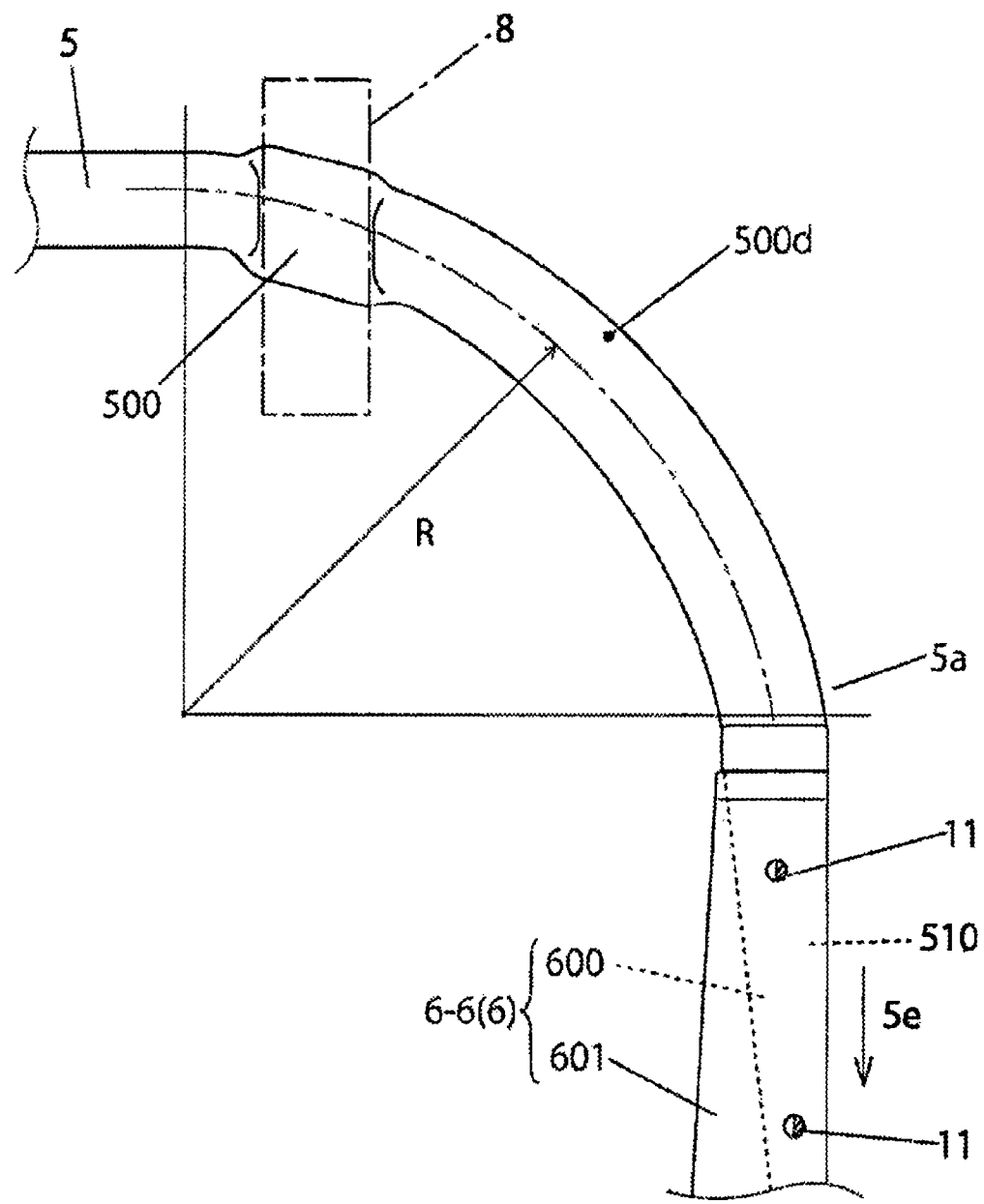
Figures 4, 12:
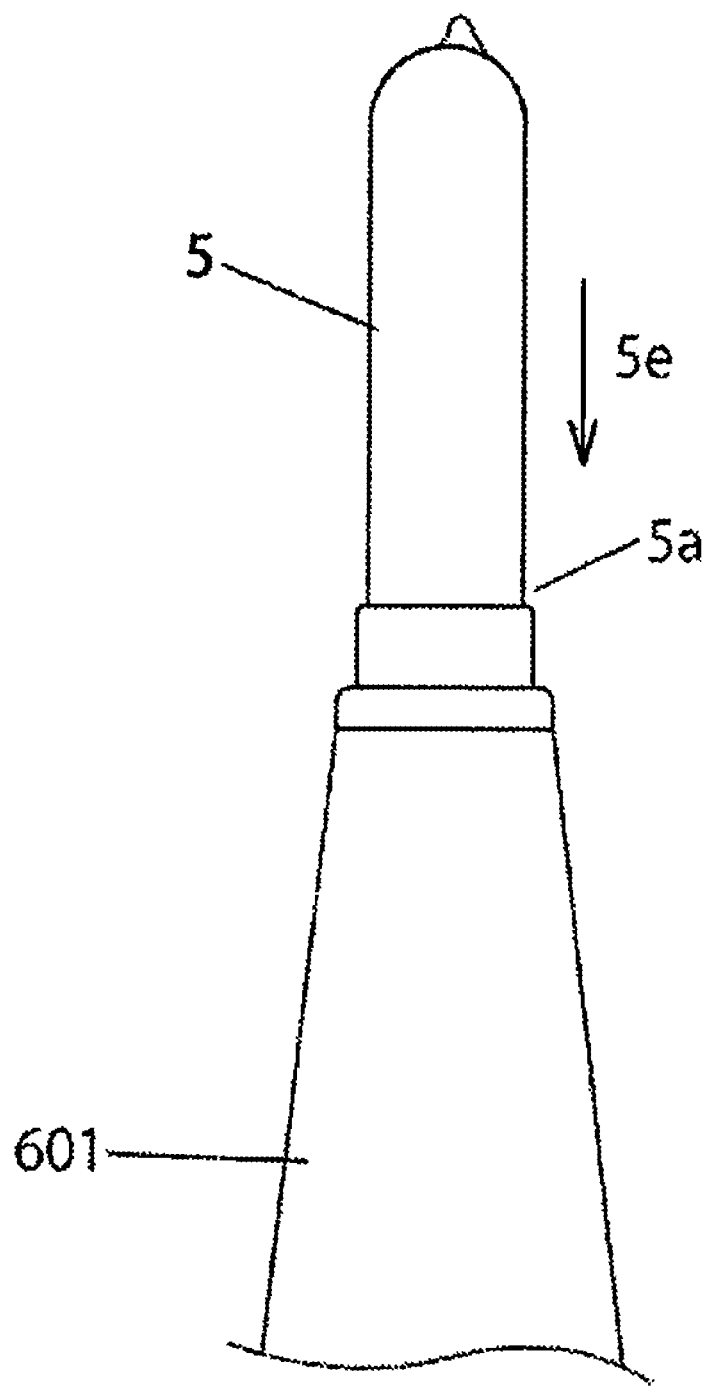
Figures 5, 12:
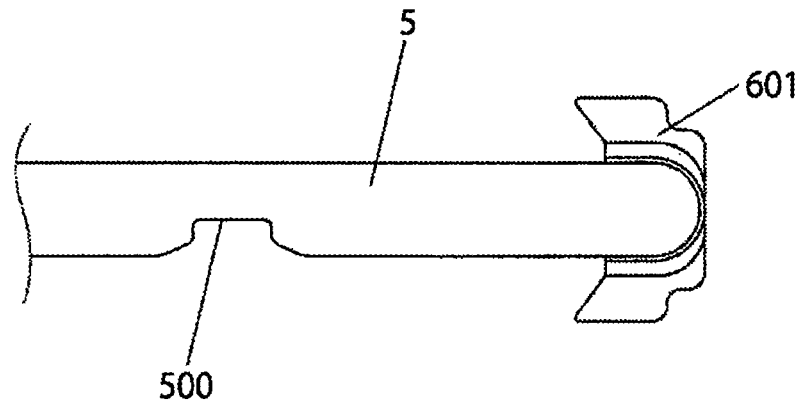
Figures 6, 12:
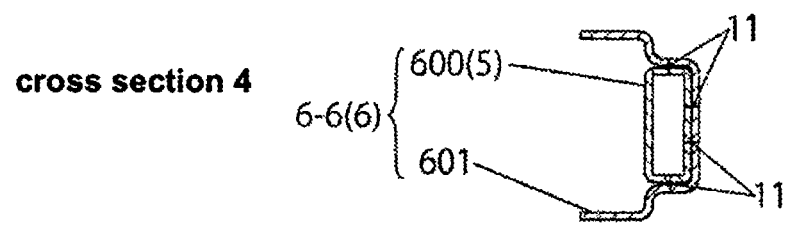
Figures 7, 12:
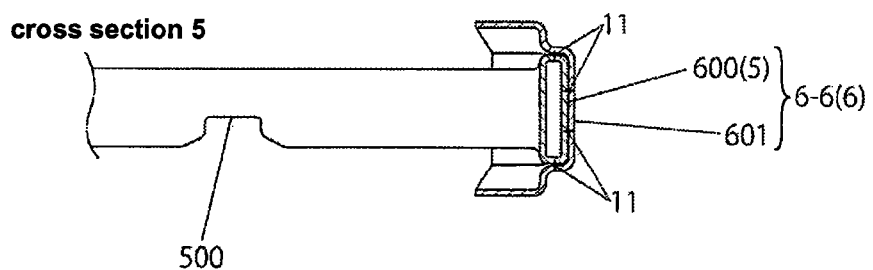
Figures 8, 12:
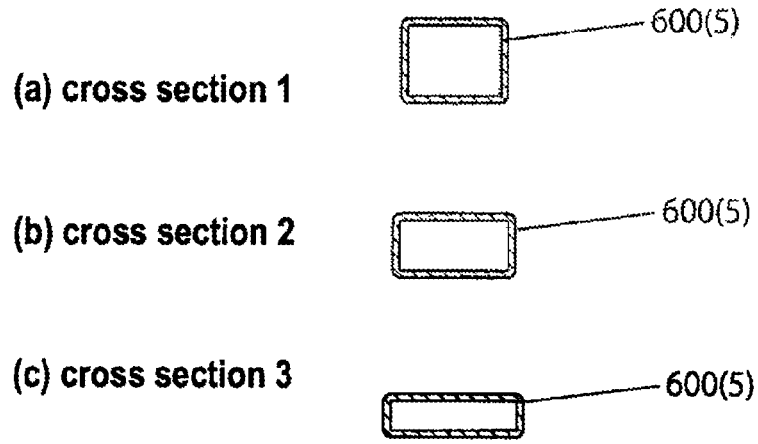

FIG. 12-1 is a perspective view, showing partially the main part of the upper frame, with both free ends (one end not shown) of the pipe (material) having been formed into flat rectangular tubes in an axial direction, and with a side frame unit shown having been provided on the rectangular tube.

FIG. 12-2 is a frontal view of FIG. 12-1, showing details of the welding portions.

FIG. 12-2-1 shows the maximum curvature of bending radius R and shows the variation in thickness of the pipe diameter of the upper frame.

FIG. 12-2-2 shows bending radius R of the upper frame, as shown in FIG. 12-2, and shows the variation in curvature at each measuring point.

FIG. 12-3 is a left side view of FIG. 12-2.

FIG. 12-4 is a right side view of FIG. 12-2.

FIG. 12-5 is a top view of FIG. 12-2.

Figure 14:
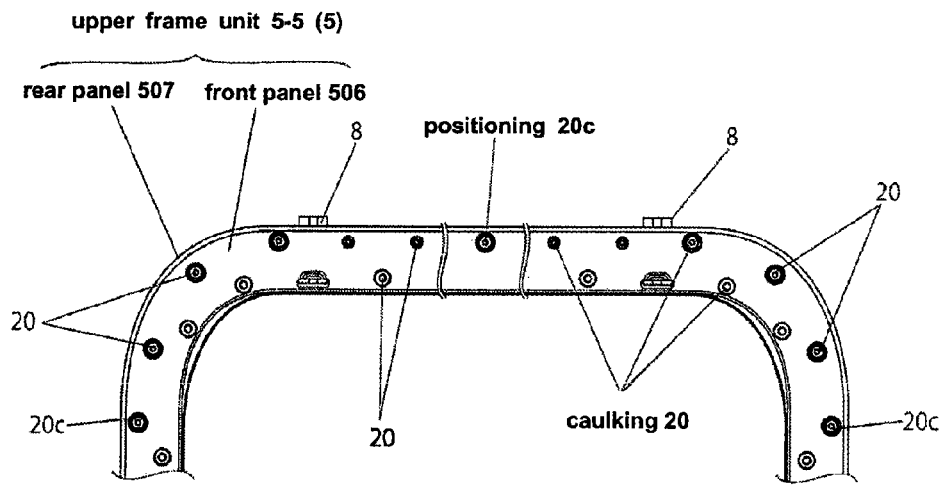

FIG. 12-6 is a cross-sectional view of cross-section 4, as shown in FIG. 14-3.

FIG. 12-7 is a cross-sectional view of cross-section 5, as shown in FIG. 14-3.

FIG. 12-8 shows end surfaces (a), (b) and (c) of cross-sectional surfaces 1, 2 and 3, respectively, as shown in FIG. 14-3.

Figures 1, 13:
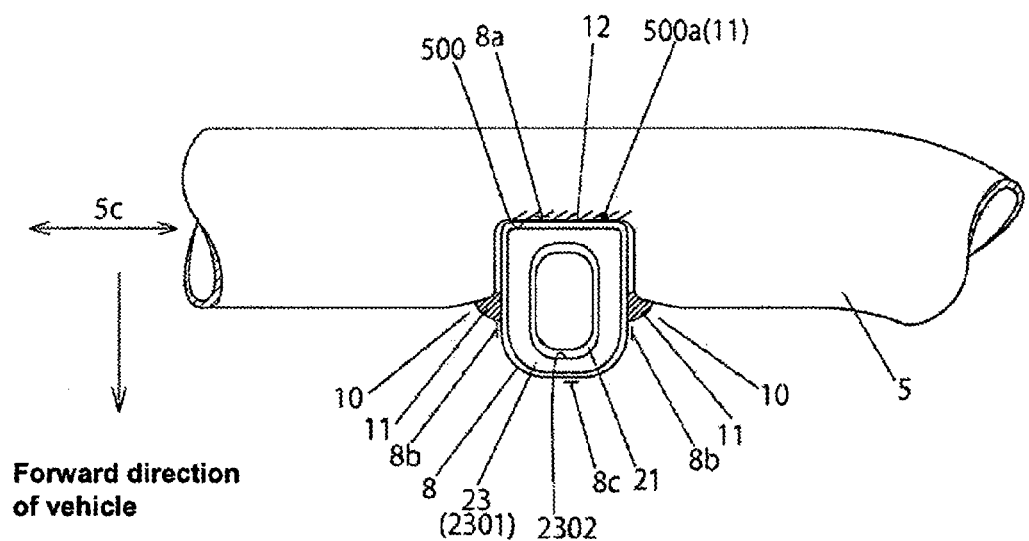
Figures 2, 13:
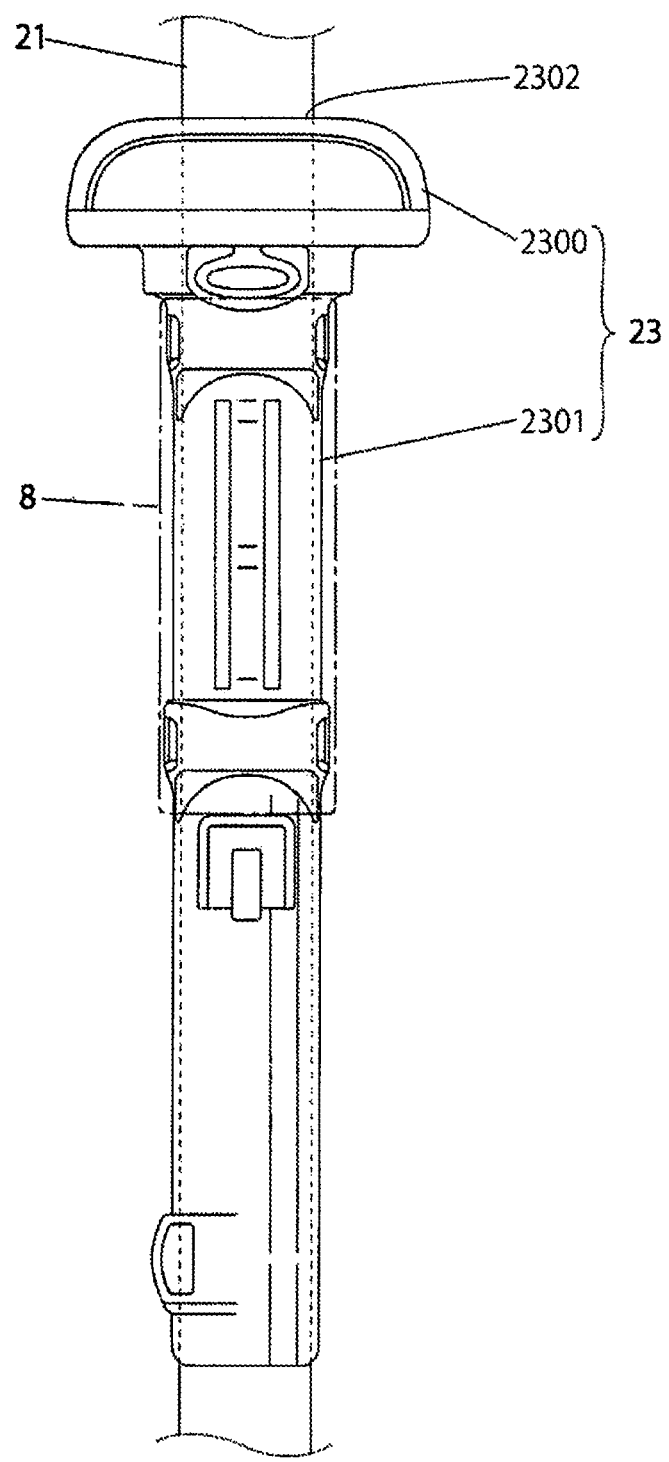
Figures 3, 13:
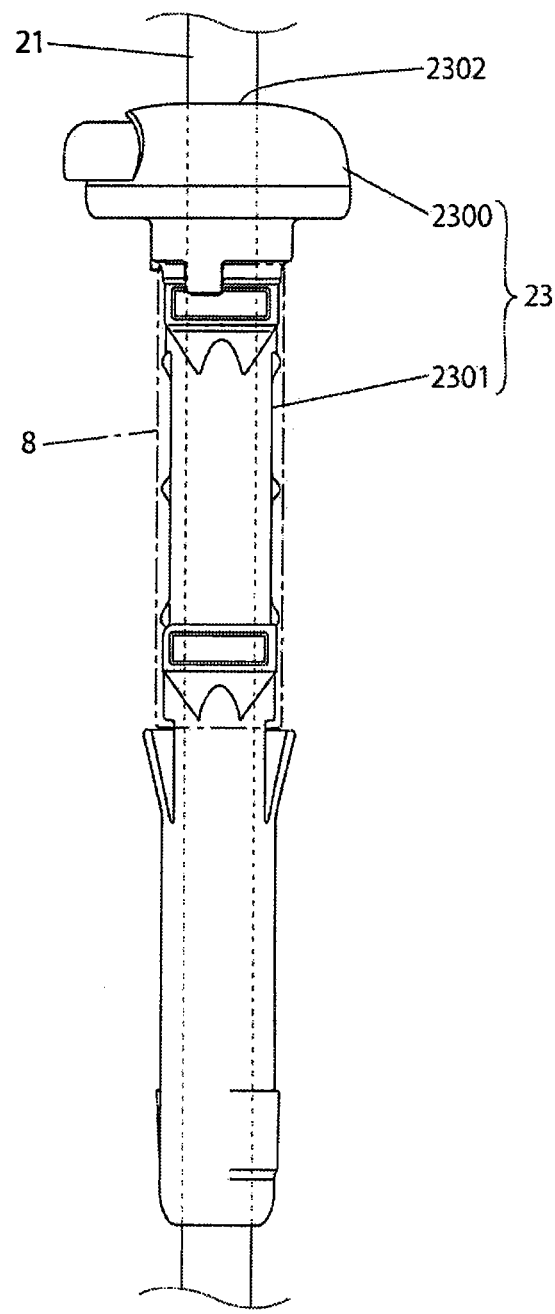

FIG. 13-1 is a top view of the bracket, of the headrest support and of the headrest stay, as seen, having been formed rectangularly.

FIG. 13-2 is a side view of FIG. 13-1.

FIG. 13-3 is a frontal view of FIG. 13-1.

FIG. 14 is a partially-omitted view showing how the main part of the paneled upper frame unit (or side frame unit) with brackets is positioned.

Figure 15:
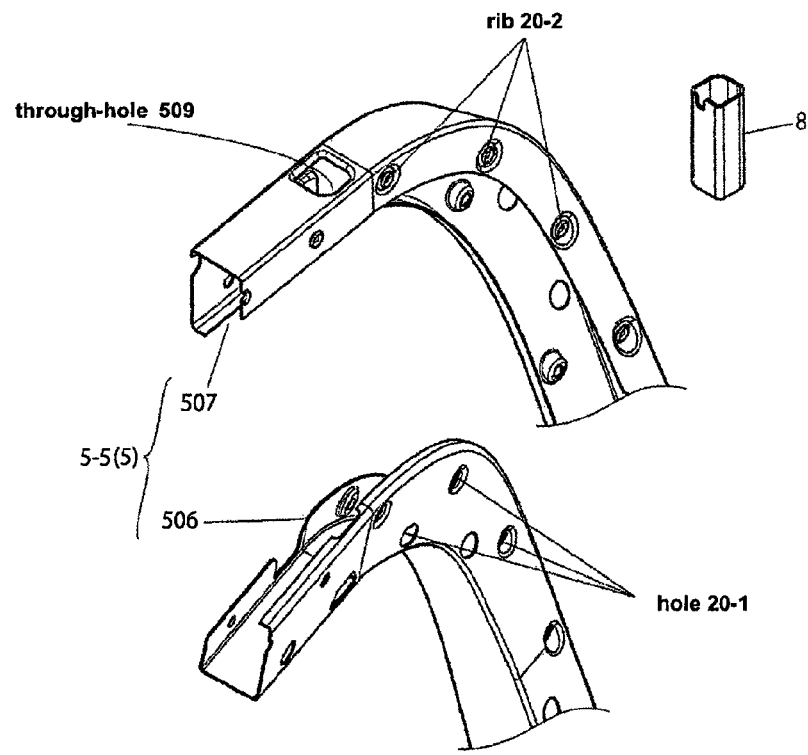

FIG. 15 is a perspective-exploded view of the bracket, of the front panel (inner side panel) and of the rear side panel (outer side panel) of the main part of the upper frame unit.

Figure 16:
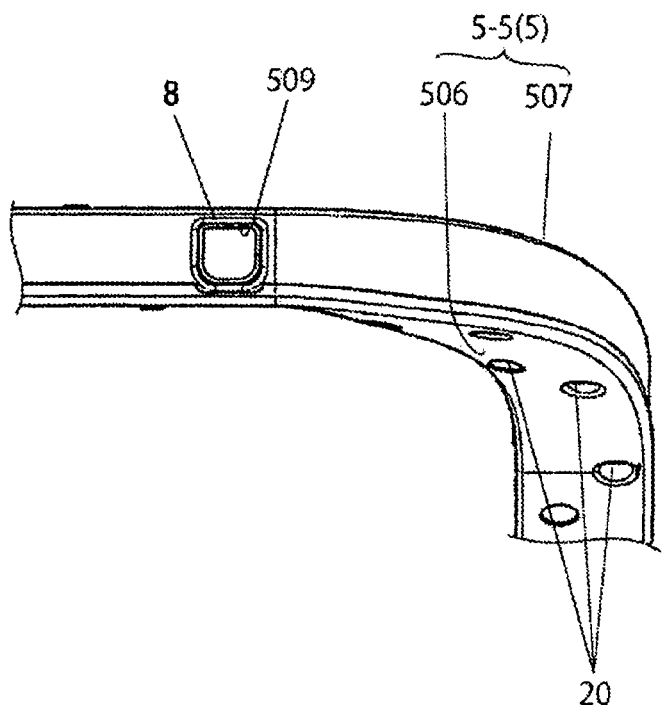

FIG. 16 is a top view of the upper frame unit showing the bracket having been inserted into the through-hole of the upper frame unit.

Figures 1, 17:
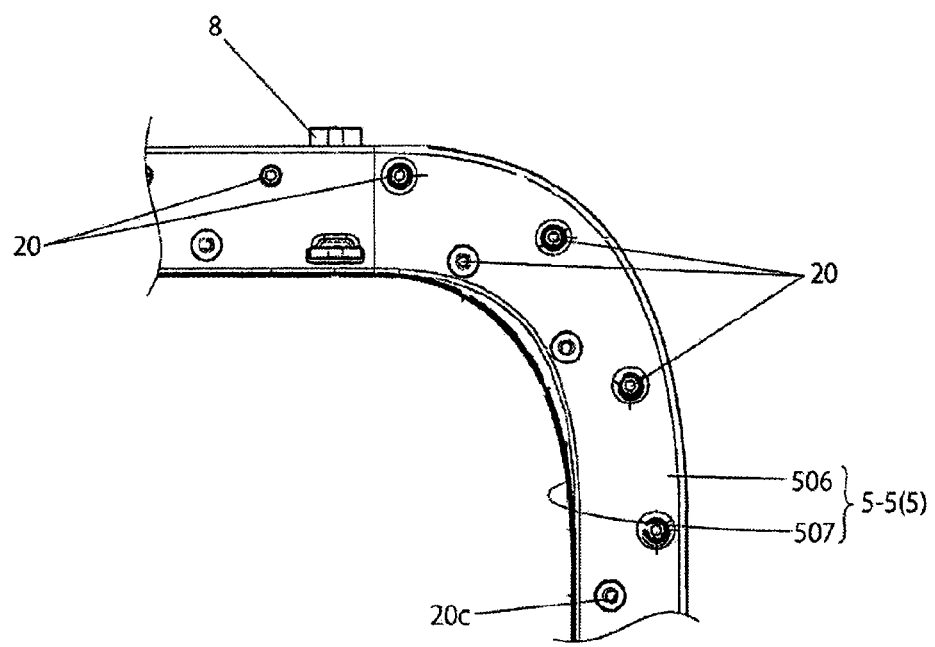
Figures 2, 17:
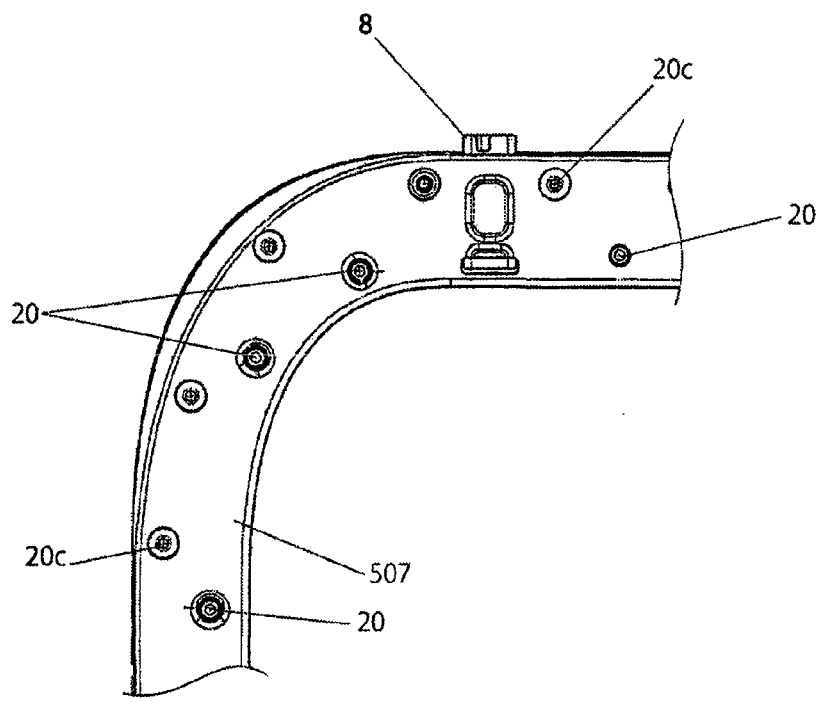

FIG. 17-1 is a frontal view of FIG. 16.

FIG. 17-2 is a rear view of FIG. 16.

Figure 18:
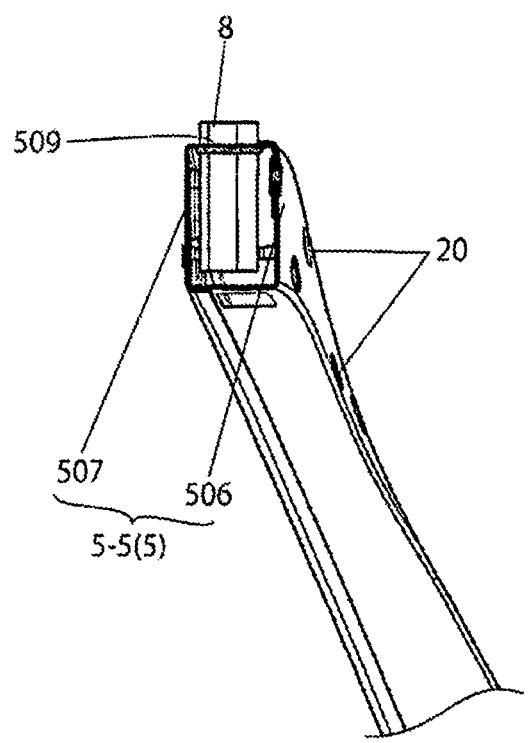

FIG. 18 is a cross-sectional view of the through-hole and of the bracket, as shown in FIG. 16.

Figures 1, 19:
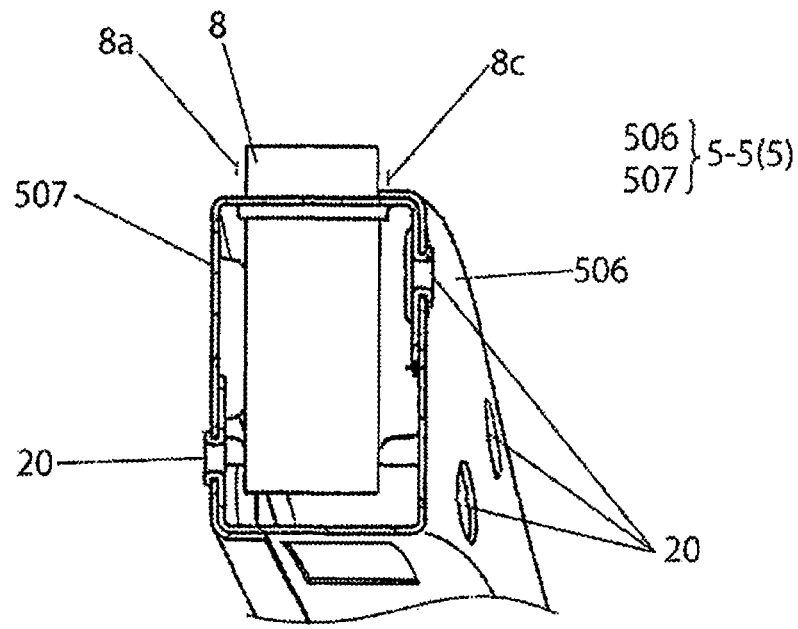
Figures 2, 19:
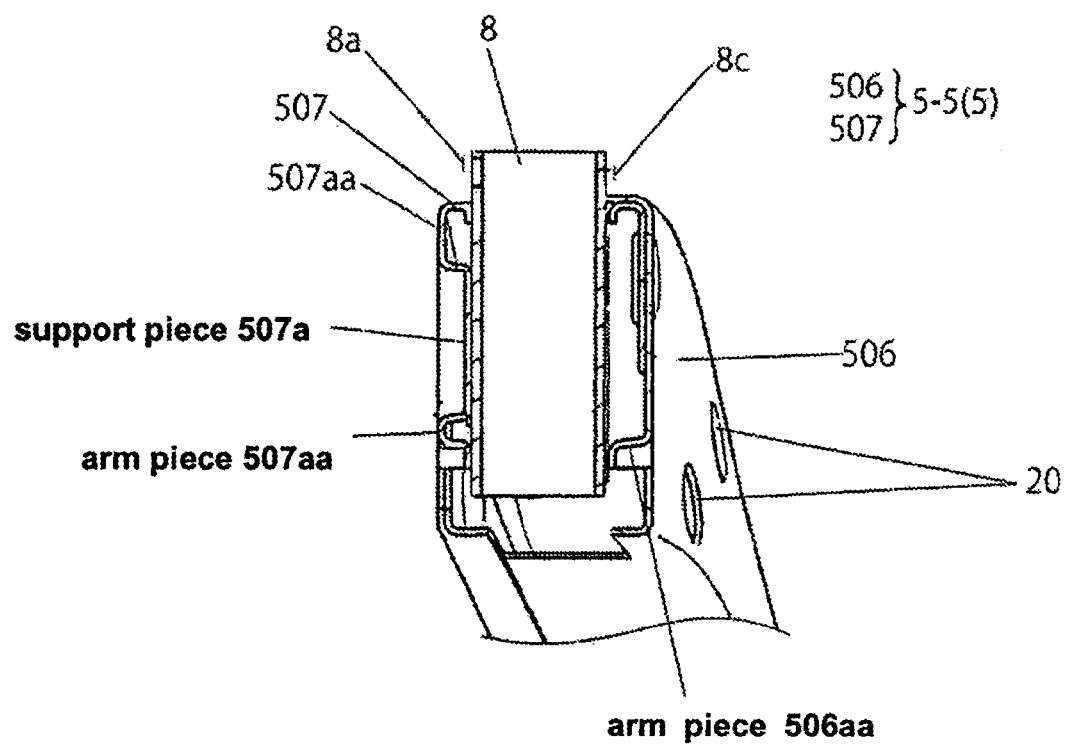
Figures 1, 3, 19:
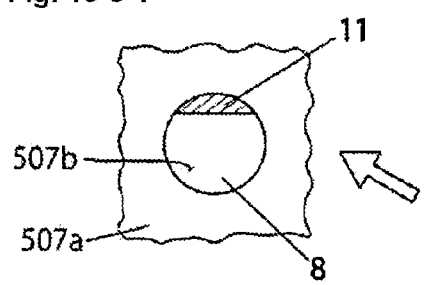
Figures 2, 3, 19:
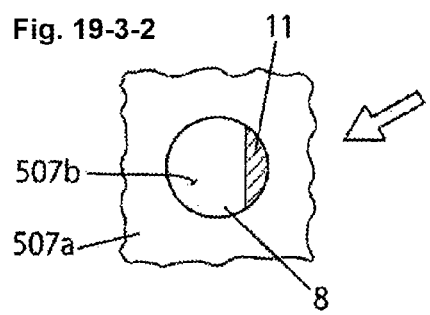
Figures 3, 19:
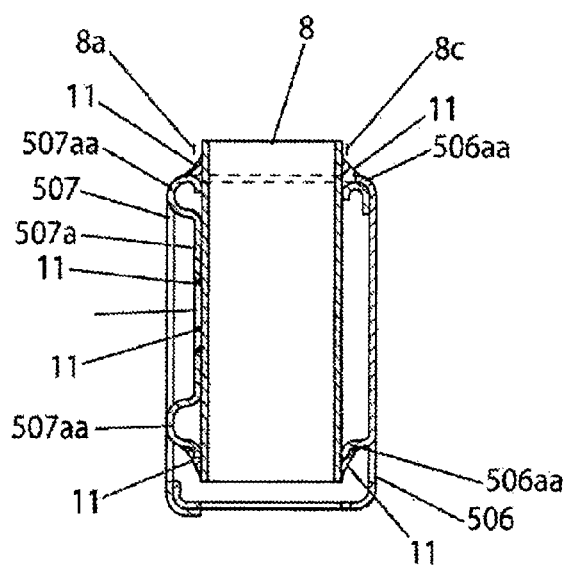
Figures 4, 19:
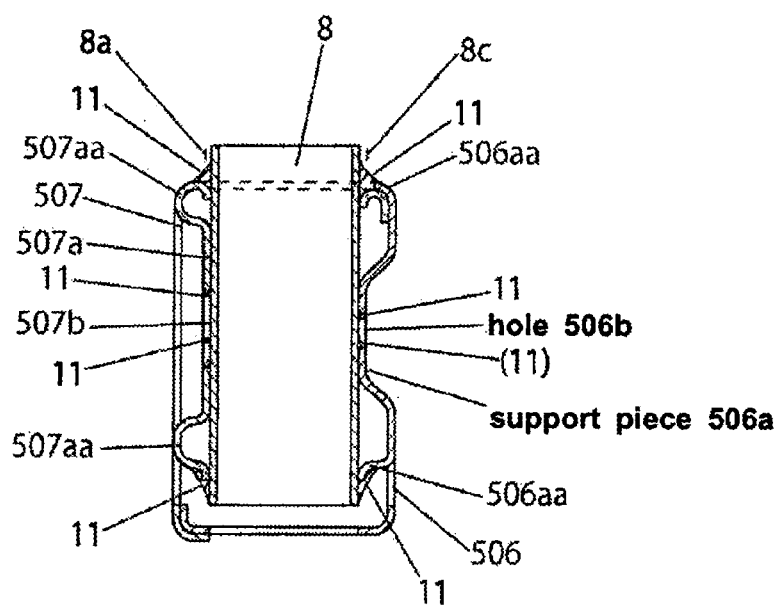

FIG. 19-1 is a cross-sectional view of an embodiment showing mainly the through-hole and bracket.

FIG. 19-2 is a cross-sectional view of another embodiment showing mainly the through-hole and bracket.

FIG. 19-3 is a cross-sectional view of the welding portion showing an example for welding the through-hole and the bracket.

FIG. 19-3-1 is an enlarged cross-sectional view of the major part of the welding portions, as shown in FIG. 19-3.

FIG. 19-3-2 is another enlarged cross-sectional view of the major part of the welding portions, as shown in FIG. 19-3

FIG. 19-4 is another cross-sectional view, specifically showing the welding of the through-hole and the bracket.

Figures 1, 20:
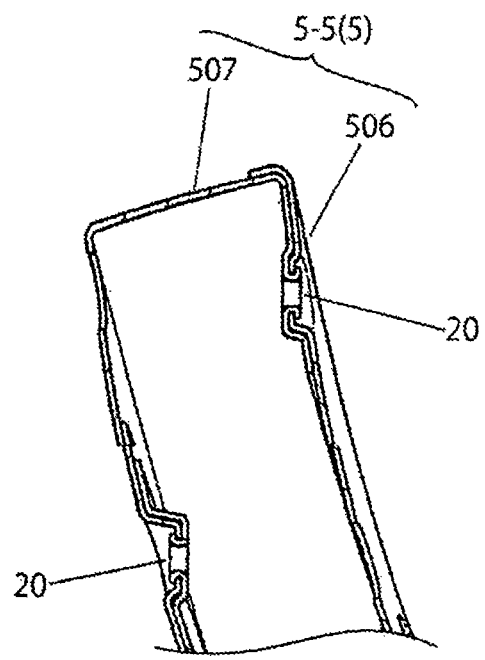
Figures 2, 20:
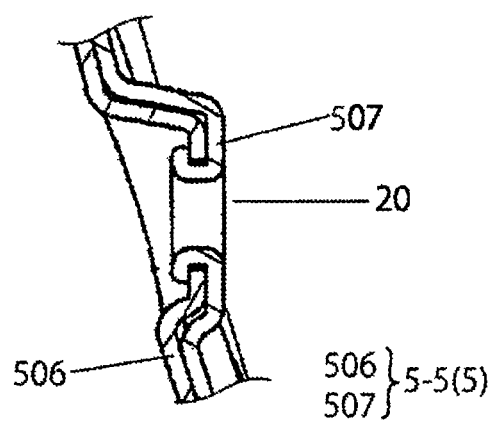

FIG. 20-1 is a cross-sectional view of the main part of the front panel or rear panel of the upper frame unit.

FIG. 20-2 is an enlarged cross-sectional view of the caulking method, as shown in FIG. 20-1.

Figures 1, 21:
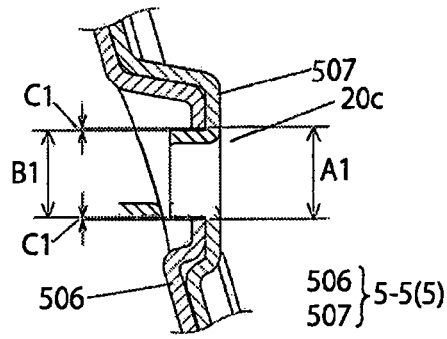
Figures 1, 21:
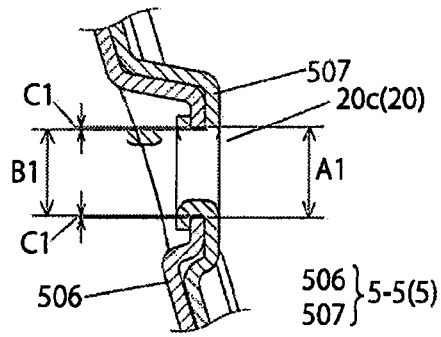
Figures 2, 21:
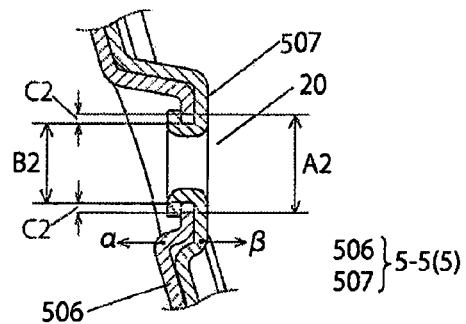
Figures 3, 21:
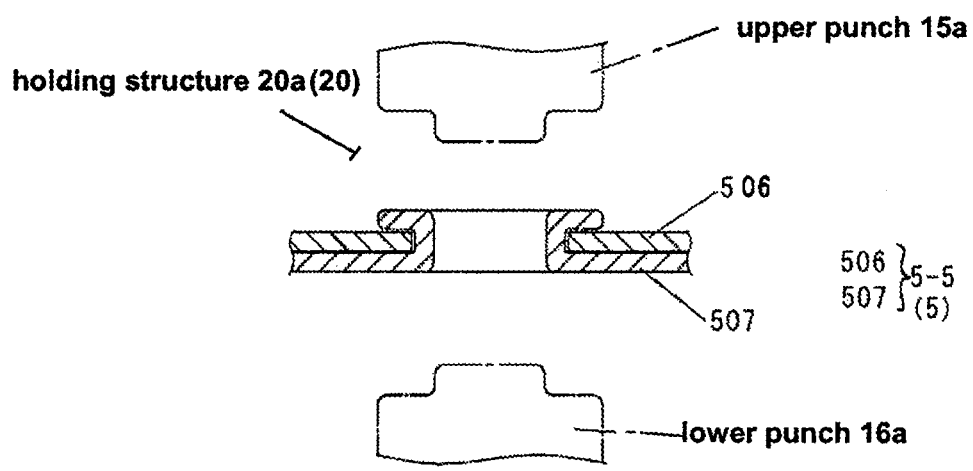
Figures 4, 21:
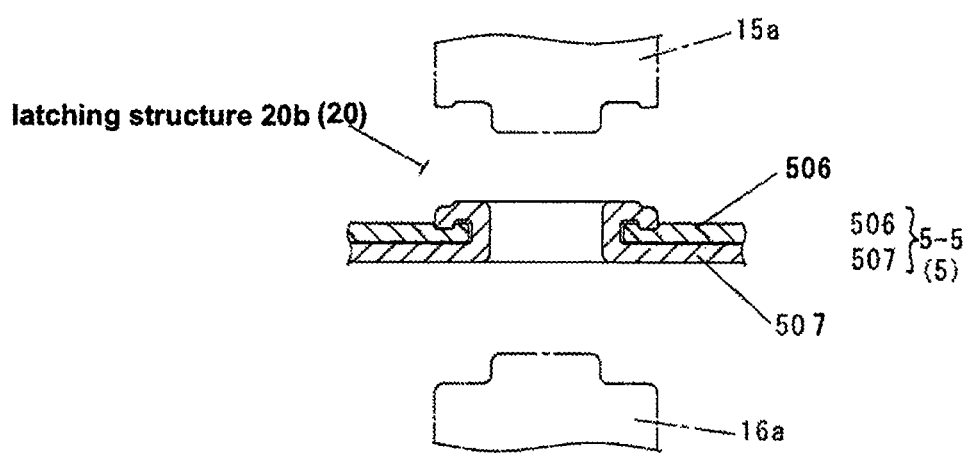

FIG. 21-1 is an enlarged cross-sectional view of the panels having been joined by engaging several holes and ribs, with Clearance C1 between Hole A1 and End B1 minimized.

FIG. 21-1-1 shows the positioning of the panels by the caulking method, and of Clearance C1, as shown in FIG. 21-1, as having been ensured.

FIG. 21-2 is an enlarged cross-sectional view showing the use of caulking to fix the panels which have been joined by engaging several holes and ribs, with Clearance C2 between Hole A2 and Rib B2 comparatively enlarged, in accordance with the intended use.

FIG. 21-3 is an enlarged cross-sectional view of the main part of the caulking mold, as shown in FIG. 20-1.

FIG. 20-4 is an enlarged-cross sectional view of the major part of another different caulking mold, as shown in FIG. 20-1.

Figure 22:
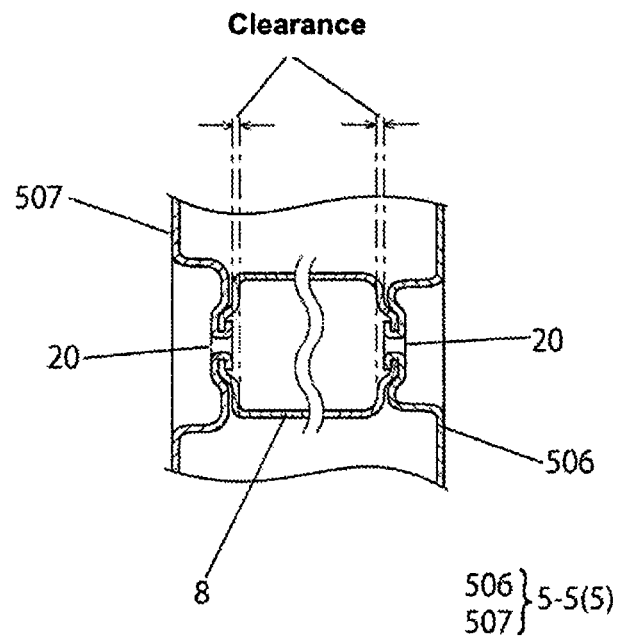

FIG. 22 is an enlarged partially-omitted top view of the bracket having been caulking-fixed between the front and rear panels (i.e. the panel of the front of the seatback and the panel of the rear of the seatback), with clearance provided on the bent portion of the caulked rib, between the front and clinch (rear) face, to obtain flexibility.

Figure 23:
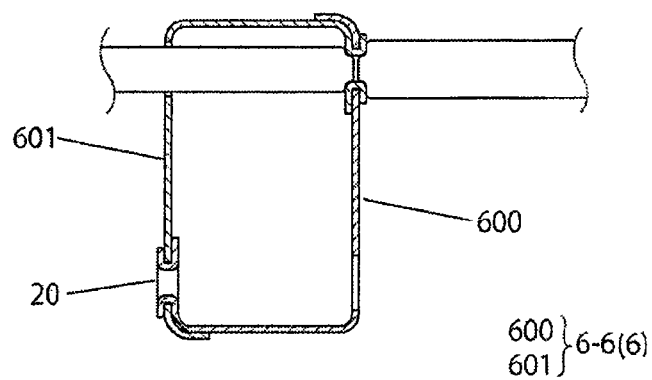

FIG. 23 is a cross-sectional view of the caulking-fixed front and rear panels of the side frame unit and of the mold (die and punch).

Figures 1, 24, 25:
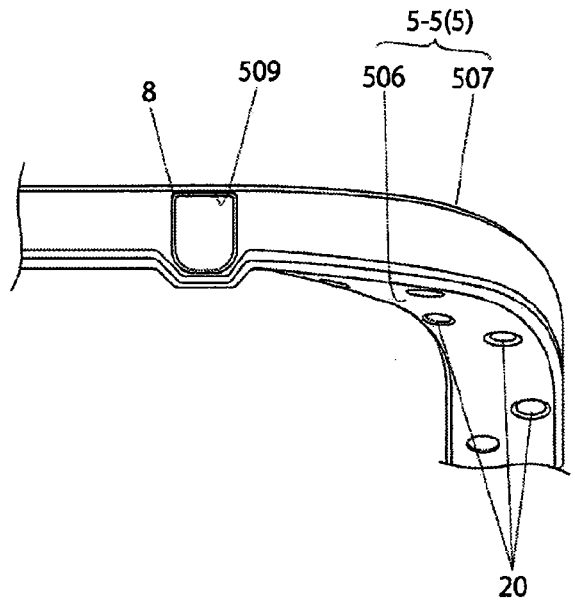

FIG. 24 is a top view of the rectangular bracket and headrest support, as shown in FIG. 13-1 have been attached to the upper frame unit of the panel construction.

FIG. 25-1 shows Charts (a) and (b) of embodiments of various combinations for joining the bracket to the upper frame by welding or the like, with Types A (a) to F(a) and A(b) to F(b) preferred.

FIG. 25-2 shows a chart of various embodiments for forming the upper frame unit or the side frame unit by caulking and/or by positioning, as well as by welding, with A(c) to E(c) preferred.

FIG. 25-3 shows a chart of various embodiments of various types of holes used for caulking and positioning, with Types A(d) to J(d) preferred.

Figures 1, 26:
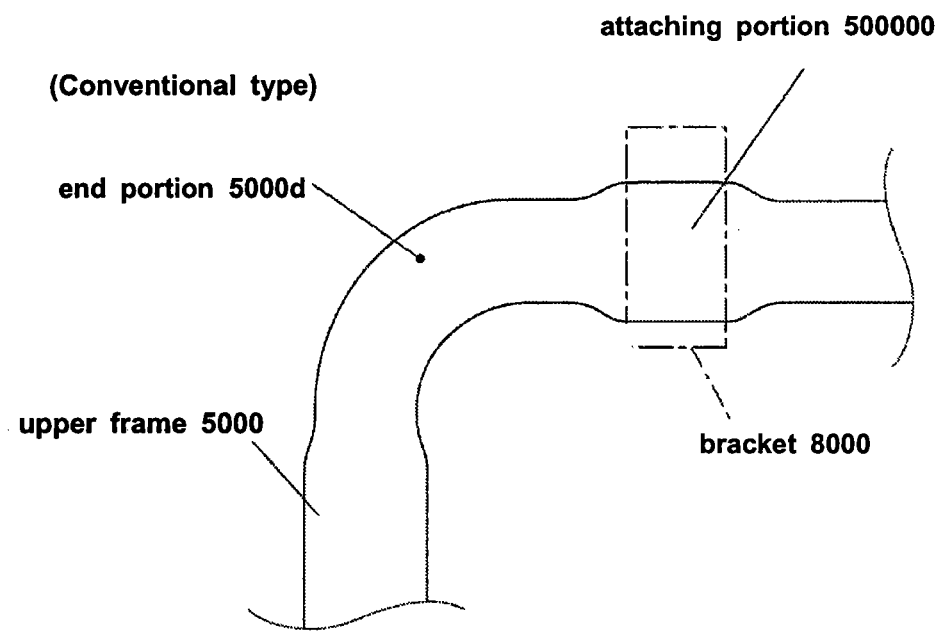
Figures 2, 26:
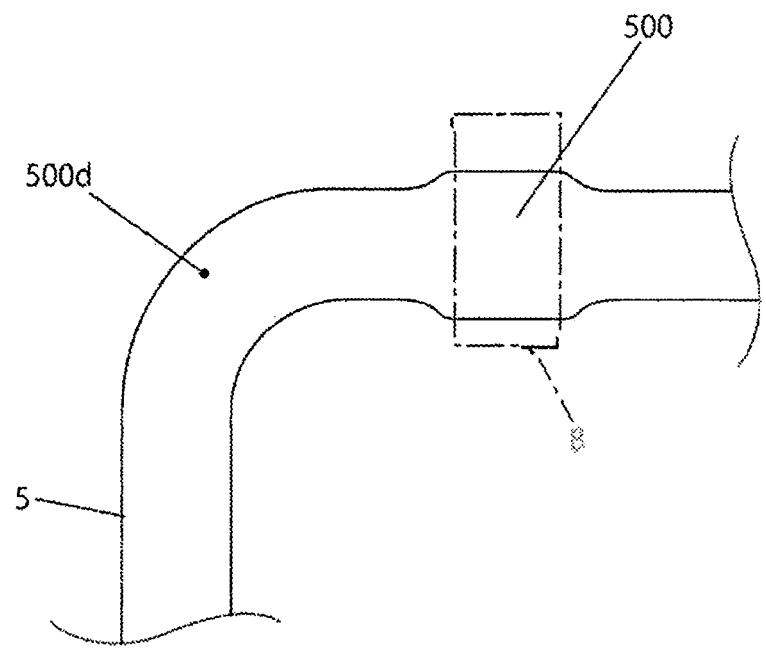
Figures 3, 26:
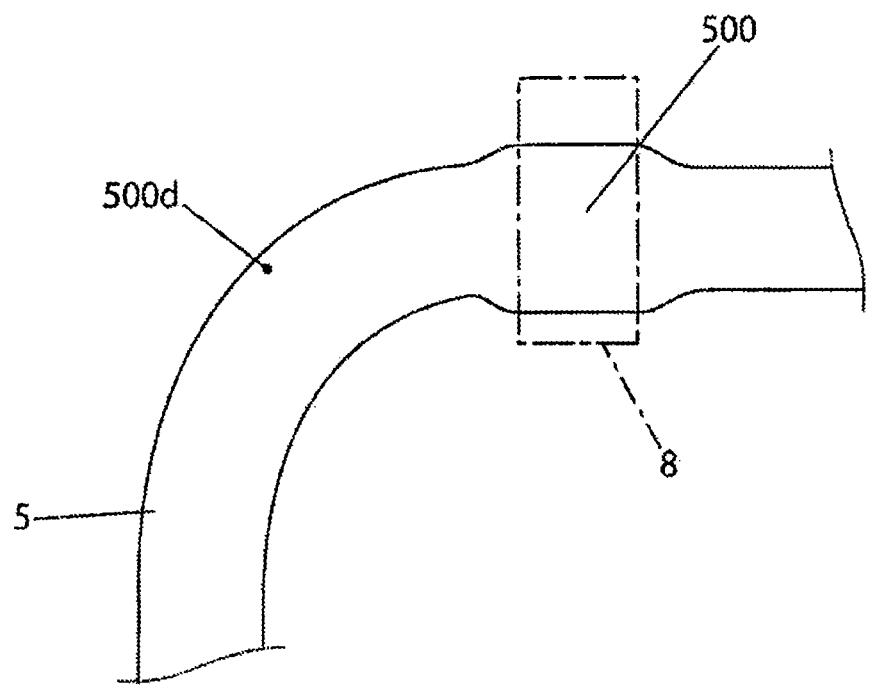
Figures 4, 26:
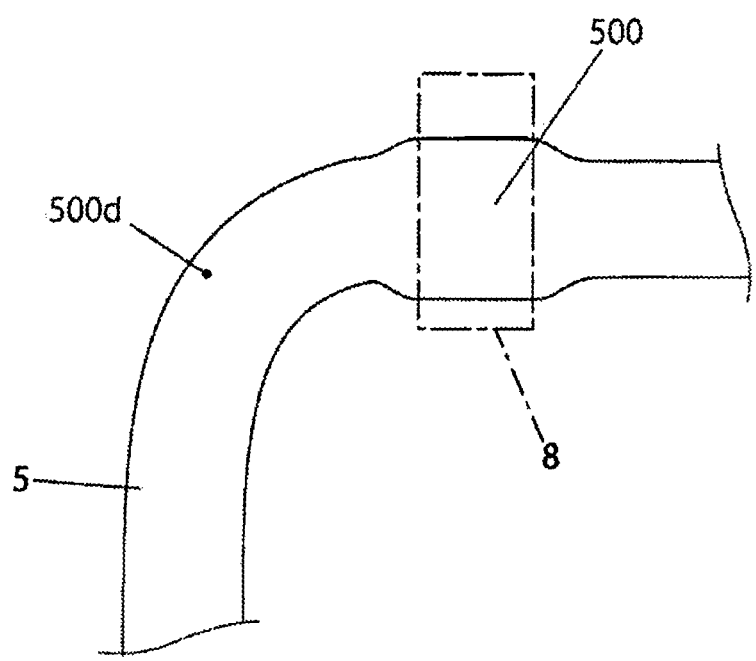

FIG. 26-1 is an enlarged view of the major part of a conventional upper frame, showing the relationship between the bending angle of the lateral end and the attaching portion.

FIG. 26-2 is an enlarged view of the major part of the inventive upper frame, showing the relationship between the bending angle of the lateral end and the attaching portion.

FIG. 26-3 is an enlarged view of the major part of the inventive upper frame, showing another example of the relationship between the bending angle of the lateral end and the attaching portion.

FIG. 26-4 is an enlarged view of the major part of the inventive upper frame, showing still another example of the relationship between the bending angle of the lateral end and the attaching portion.

Figure 27:
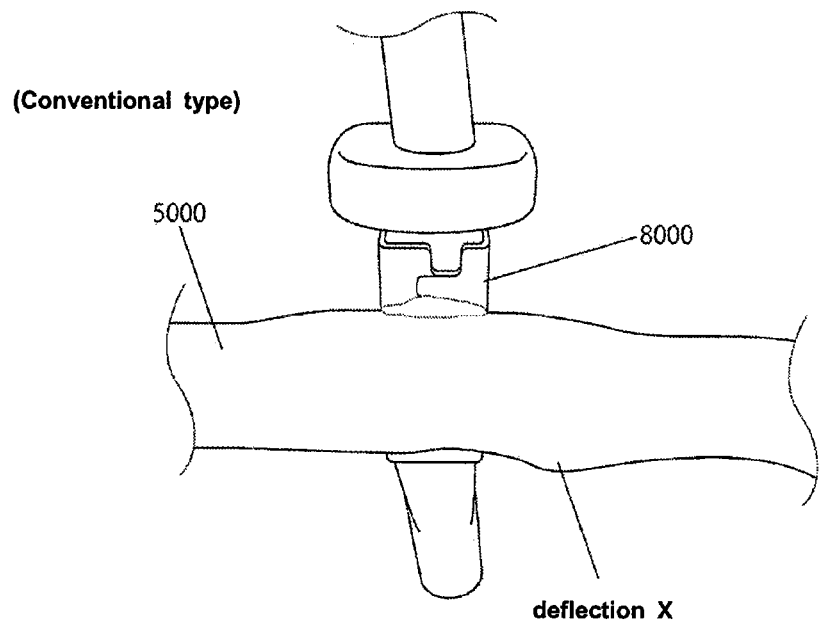

FIG. 27 shows the bentness (distortion) of a conventional upper frame after vehicular collision.

Figure 28:
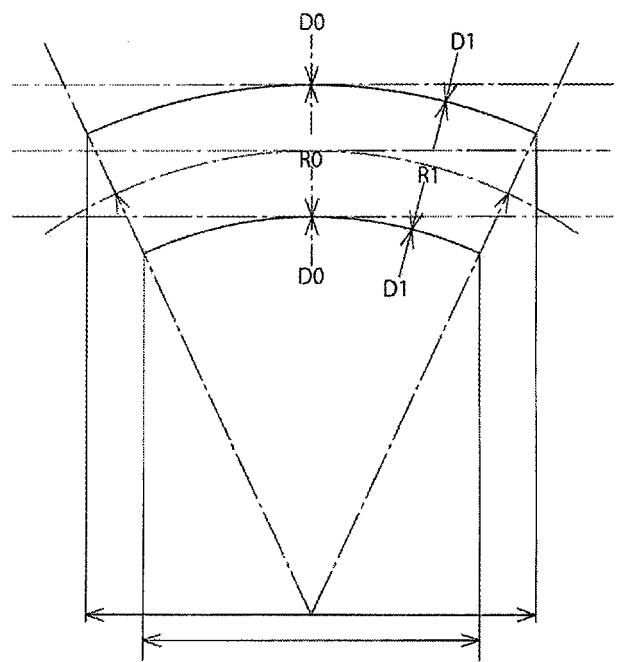

FIG. 28 theoretically shows the curvature of Pipe Diameter D1 of the upper frame, as shown in FIG. 6-1, as being nearly equal to Pipe Diameter D0, beneath, and of Pipe Thickness t1 of the curvature as also being nearly equal to Pipe Thickness t0, beneath.

Figure 29:
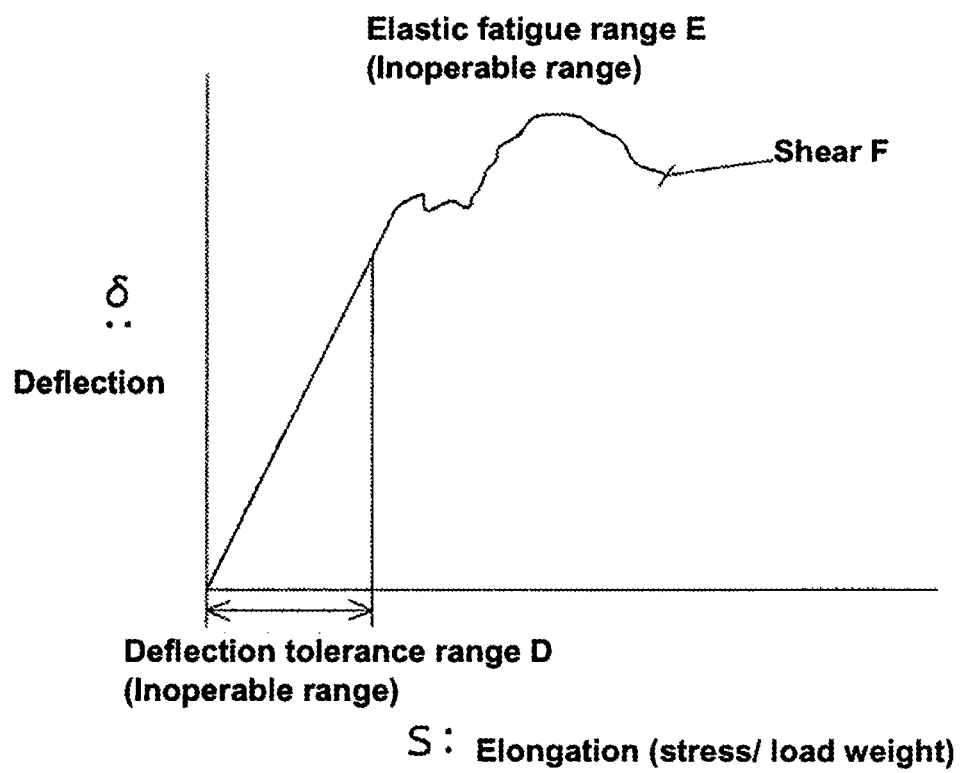

FIG. 29 is a graph showing the relationship between deflection and elongation (of the upper frame).

DETAILED DESCRIPTION OF THE INVENTION

FIG. 1 shows a seat 1 made of a seat cushion 100 and a seatback 101. The seat cushion 100 incorporates a seat frame 2, and the seatback 101 incorporates a seatback frame 3.

Ends 5a, 5a (hereinafter referred to as only "5a" when representing "pair 5a, 5a") of an upper frame 5 are attached to the seatback frame 3 at side frame 6,6, with a reinforcing arm or the like of a lower frame 7 provided beneath.

Two flat or nearly flat areas are formed by a squeeze-pressing process on the inner side of both end portions 500d in a lateral direction 5c (the sideways direction of the vehicle seat) of the pipe of the upper frame 5 to form two attaching portions 500. The flat areas are inclined when mounting the upper frame 5 on the vehicle seat.

Attaching wall portions 501 are formed at both ends of an attaching portion 500 in the lateral direction 5d (the perpendicular direction of the vehicle seat). As for using the attaching wall portions 501, as shown in FIG. 4-1, their strength and different shape, as shown in FIG. 4-2, are considered regarding productivity and simplicity of welding.

The depth of the squeeze-pressing (Offset L) of the attaching portion 500 is shown in FIG. 8, and a tool 4 is shown in Example (a) of FIG. 8. Various attaching portions are available for the structure of the attaching portion 500. For example, as shown in Example (a) of FIG. 8, the attaching portion 500 can be a structure of which the offset L (squeeze-pressing process) is set on the center 5b on the upper frame 5.

In Example (b) of FIG. 8, the attaching portion 500 is a structure of which an offset L is set just before the center 5b, for instance at approximately 3 mm just before the center 5b (3 mm is just an example and not limited to that distance). This structure utilizes the elasticity of the upper frame 5 and increases strength and ensures durability. In Example (c) of FIG. 8, the attaching portion 500 is a structure of which an offset L is set behind the center 5b, for instance at approximately 3 mm just behind the center 5b, thus providing greater strength.

However, Example (c) of FIG. 8 presents problems such as complexity of the squeeze-pressing process, greater skills, and countermeasures against cracking or the like. It is advantageous to obtain flat (or nearly flat) areas and/or various sizes of the flat area by the squeeze-pressing process for the sake of improving the accuracy and strength of the welds, or for increasing the contacting (welding) area of the bracket 8, to be described below, and for ensuring a clearance for welding. As described above, the depth range of the offset L (depth stop position) is arbitrarily set either at center, before center, or past center, or the like.

A clinch face 8a (as an example) of the bracket 8 (headrest bracket) is provided on the attaching portion 500. The clinch face 8a is attached to the attaching portion 500 with a clearance. The attaching wall portions 501, 501 (hereinafter referred to as 501) are formed by the squeeze-pressing process at both sides of the attaching portion 500 in the vertical direction 5d, so that the clinch face 8a and sides 8b, 8b (hereinafter referred to as 8b) are positioned on the attaching portion 500 and between the attaching wall portion 501.

In this structure, a welding point 10 which is formed between a free end 501a of the attaching wall portion 501, and sides 8b of the bracket 8 is processed by welding 11. The welding point 10 is the support portion between the free end 501a and sides 8b, or is the clearance to be welded. Also, an upper bent portion 500b and/or a lower bent portion 500b which are formed when squeeze-pressing the attaching portion 500 (hereinafter referred to as "upper and lower bent portions) and a welding point 12 on the clinch face 8a of the bracket 8 are processed by welding 11 in the lateral direction 5c of the upper frame 5. (The welding point 12 is the support portion between the upper and lower bent portions 500a, 500b and the clinch face 8a, or is the clearance to be welded). As described in this example, welding the upper and lower bent portions 500a and 500b and the welding point 12 improves the connection and strength between the upper frame 5 and the bracket 8.

As shown in FIG. 5-1 or the like, the squeeze-pressing position of the attaching portion 500 of the upper frame 5, i.e. the positional relationship between the upper and lower bent portions 500a, 500b and the welding 11, is arbitrarily chosen. For example, it is preferable to take one way (L1) from the center 5b of the upper frame, as shown in FIG. 8. As for the welding 11, between the attaching wall portion 501 and sides 8b of the bracket 8, it is still preferable to lengthen the length L3 (which is the distance to the center 5b) and to shorten the welding 11 (the welding point 10) to increase the strength.

A length 500c in the lateral direction 8d of the bracket attaching portion is about the same length between sides 8b of the bracket 8. In this example, a two-slit welding 11 is done vertically (on the front side of the vehicle seat) and another two-slit welding 11 is done in the lateral direction 8d.

However, as shown in FIG. 5-1, the pressing process is substantively used to make an angle θ, so there are still some improvements, since the welding amount increases, and hollow open diameter A of the concave portion, formed by the pressing process, becomes large, which cannot secure the largeness of bending radius R (which is almost the same as a radius R made by the conventional pressing process). Such improvements can be made by using the cutout 502, to be described below.

FIGS. 9-1 to 9-3-1 shows an example to form the attaching portion 500 by having a structure in which two cutouts 502 (slits) are provided on the upper frame in the vertical direction 5d. For example, use a pair of V-shaped cutters (not shown in the drawings) to make two cutouts 502, each having a V-shaped cutout on the upper frame 5, then use a tool 4, for instance, to press an area between the two cutouts 502. Thus, the attaching portion 500 is formed together with the half cutout portion 503 on both sides. The half cutout 503 and the cutouts 502 make a hole 504 on the upper frame 5.

Thus, when bringing the clinch face 8a of the bracket 8 into contact with the attaching portion 500, both sides 8b of the bracket 8 contact the half cutout portion 503, and the welding area 11 in the vertical direction is enlarged. It is shown to increase the strength of the bracket 8 and/or the upper frame 5 or the like.

When simultaneously using a further structure to process two more welding 11 in the lateral direction 8d of the bracket 8 (in the lateral direction 5c of the upper frame 5), as described above, it is possible to improve the strength of the upper frame 6, as well as to prevent it from deflecting, twisting or the like. In this example, the elasticity of the half cutout pipe 503 forms a hole 504, thus preventing the bracket 8 from deflecting, twisting or tipping over.

There is another example, as described in FIG. 9-4 to FIG. 9-6-1. In this example, the two cutouts 502 (not shown in the drawing) are processed by using a cutting tool consisting of a straight blade on the outer side and a tapered blade on the inner side. Thus, the two cutouts 502 having a different V-shaped cut-put surface are formed on the upper frame 8. The area between the two cutouts 502 is pressed by using a tool (not shown in the drawing) which incorporates a curved inner surface and a hollow portion.

Thus, the process as described above makes an attaching portion 500 and a half cutout 503 on both sides of the attaching portion 500, in which the upper and lower end portions are curved and the mid area is flat (a flat shape in the vertical direction 5d). The half cutout pipe 503 and the cutout 502 form a hollow 504 on the upper frame 5. Processing the flat 503a by welding 11 is effective in improving the accuracy of the welding itself, and in reducing the welding length and/or the welding area, which leads to efficiency and cost reduction of the welding process. Although the welding 11 has different modes (not shown in the drawings), it is basically aimed at reducing the length of the welding 11 or welding points, eventually performing an efficient welding 11. Other aspects of the welding are based on FIGS. 9-1 to 9-3-1.

Also, FIGS. 10-1 to 11-3 show different types of holes 505 of the upper frame 5 in which a pin 13 (corresponding to each different shape of the hole 505) is inserted into the hole 505, thus supportingly contacting the sides 8b of the bracket 8, so as to prevent the bracket 8 from deflecting, twisting or tipping over (thus, improving strength). FIG. 25-2 shows each example. Yet, the shape is not limited. Other examples include wires, plate-like devices, or the like.

It is possible to process the pin 13 and the sides 8b by the welding 11 (not shown in the drawings) to prevent the bracket 8 and/or the upper frame 5 from deflecting, twisting or the like, and to improve the strength or the like. Also, the number of the pins 13 and their positions are not limited, and only one side of the sides 8b can be processed. Any shape and material of the pin 13 can be considered.

FIGS. 10-1 and 10-2 show a structure when using the pin 13. On the other hand, FIGS. 11-1 to 11-3 show a structure when using the two pins 13. However, they are structurally similar. Also, the hole 505 can be of a structure having punched holes, ribs or the like. Although it is not shown in the drawings, the structure using the pin 13 can be adopted for each embodiment.

A jig for making a hole 505 is used. The jig, for example, is a metallic mold or the like in which an upper punch 15 (punch) is provided on the upper mold, and a lower punch is provided on the lower mold. There are various types of holes, such as Type A: one hole 505 is provided on both sides 8b of the bracket 8; Type B: two holes are provided on both sides 8b of the bracket 8; or another type: Types A and B are both used (not shown in the drawings). Of course, there is another type which includes no hole 505 nor pin 13.

An ideal shape of the pin 13 is a rectangular cylinder. However, a polygonal shaped or round-shaped pipe or the like can also be used. A burring 505a is formed around the hole 505 by using the tool 14, which improves strength against deflecting, twisting or the like. The tool 14 is pulled out after the processing is completed.

FIGS. 12-1 to 12-8 and FIG. 23 show an embodiment of a structure in which both free ends 5a of the upper frame 5 are formed into a flat shaped rectangular tube 510 in the axial direction 5e. The rectangular tube 510 has a structure in which the front panel 600 or the rear panel 601 of the side frame unit 6-6 is processed by welding 11, caulking or the like to be tightly grabbed.

In the series of these drawings, FIG. 12-2-1, for example, is a diagram showing the various sizes of the bending radius R making a variation of the diameters D0, D1 and of the thickness t0, t1 of the pile making up the upper frame 5, which is based on the description of the aforementioned FIGS. 6-1-1, 6-2-1 or the like. In FIG. 12-2-2, the bending radius R of the upper frame is maximally set, and the bending radius R is allocated from inside the attaching portion 500, which makes a small variation of the pipe diameters D0, D1 and of the thicknesses t0, t1.

The following features are expected: (A) The strength of the pipe (the upper frame 5) is increased. (Theoretically, the bending radius R is equal to the 6D 'pipe diameter'), (B) When the bending radius R is increased, the length of the upper frame 5 becomes shorter, which accordingly makes it possible to reduce the cost and weight of the materials, (C)

The pipe diameter and/or thickness vary little, so that the accuracy of the pipe is improved, (D) The strength and/or accuracy are improved, so that the number of material alternatives or the like is increased, and sometimes inexpensive or low-quality material can possibly be used. Thus, cost reduction as well as convenience of material choices and transportation can be achieved, and (E) The weight and size of the whole upper frame 5 (the entire seat 1) is reduced so as to realize savings of the natural resource, thus contributing to the protection of the global environment. The structure of the bending radius R, as shown in FIG. 12-2-2 is an example which can be introduced to other embodiments. FIGS. 12-1 and 12-2 show types of welding 11 and of the ordinary method of welding.

FIGS. 13-1 to 13-3 show a structure comprising the bracket 8 which is rectangularly shaped (square shaped, or of similar shape) in the top view, and a headrest support 23 which is part of the headrest and of the headrest stay 21. The bracket 8 of rectangular shape is shown in the top view, and the corner angle R is attached to the attaching portion 500 of the upper frame 5.

A leg portion 2301 of the headrest support 23, comprising a square shape in the top view, with the corner angle R-plane being inserted into rectangularly-shaped bracket 8. Then, the headrest bracket has a supporting structure of which the headrest 21 is formed by the rectangular pipe as shown in the a cross-sectional view and inserted into a through-hole 2302 (in rectangular shape as shown in the top view) and provided on a head portion 2300 and on leg portion 2301 of the headrest support 23. This structure is aimed at reducing weight and improving strength, compared to the conventional square-shaped bracket 8, with the headrest support 23 having the tubular (circular) head portion 2300 and the leg portion 2301 making up the headrest 22, as well as the tubular (circular-pipe shaped) headrest stay 21.

The structures, features or the like of the welding 11 are based on the aforementioned embodiments. For example, this embodiment prevents the upper frame 5, the bracket 8 and the headrest 22 from deflecting, twisting, tipping over, displacing or the like so as to realize the normal performance of the headrest 22. FIG. 25-1 shows each embodiment having a structure to integrate the bracket 8 with the upper frame 5 or the like by attaching and welding them. This chart (FIG. 25-1) shows the preferred embodiments made by various combinations, and A (a) to F (a) and A (b) to F (b) are preferably used. However, they are not limited.

As shown in FIGS. 14 to 22, the upper frame 5 can also be formed by the upper frame unit 5-5 comprising the front panel 506 (a panel on the front side) and the rear panel 507 (a panel on the rear side). In this embodiment, it is preferable to integrate the front panel 506 and the rear panel 507 by multiple caulking 20. The caulking 20 is performed by using a (metallic) jig, such as a metallic mold or the like by which the upper punch 15*a* (caulking punch) is provided on the upper mold, and the lower punch 16*a* is provided on the lower mold (caulking punch).

The caulking 20 is conducted by using various methods, for example by using a holding structure 20*a* with a simple metallic mold (as shown in FIG. 21-3), or by using latching structure 20*b* of a concave-convex engagement (as shown in FIG. 21-4), or the like. Then, a through-hole 509 is provided so that the headrest stay is inserted into the front panel 506 and into the rear panel 507 through the bracket 8. FIG. 19-3 shows the welding processes 11 by which a curved support piece 507*a* and a hole 507*b* are provided on the inner side of the rear panel 507 to process the clinch face 8*a* of the bracket 8 by the welding 11 or to process the upper and/or lower part of the arm piece 507*aa* which is formed on the upper and lower portions of the rear panel 507 by the welding 11.

It is possible to process the arm piece 506*aa* which is formed on the upper and/or lower portions of the front panel 506 and on the front face 8*c* of the bracket 8. FIG. 19-4 shows the same way as FIG. 19-3 of the welding 11 by which a curved support piece 506*a* and hole 506*b* are provided on the inner side of the rear panel 506 to process the front face 8*c* of the bracket 8 by the welding 11, or to process the upper and/or lower part of the arm piece 506*aa* which is formed on the upper and lower portions of the front panel 506 by the welding 11.

Other welding processes are based on the aforementioned examples. FIGS. 19-3-1 and 19-3-2 show each embodiment of the welding 11 to process the support piece 507 and the hole 507*b*, which are shown in FIG. 19-4.

The connecting point between the front and rear panels 506, 507, as shown in FIGS. 20-1 to 21-4 and FIG. 22, is fixed by multiple engagements, in other words, by caulking 20 to process the hole 20-1 (as shown in FIG. 25-3, yet not limited) and the rib 20-2 (corresponding to the shape of the hole 20-1). As shown in FIGS. 20-2, 21-2 or the like, according to the objective of the caulking 20, a clearance between the hole 20-1 and the rib 20-2 may be sufficiently provided. Yet, it is just an example.

One example is that the caulking 20 is done by using the metallic mold having the aforementioned upper punch 15*a* and the lower punch 16*a*. For example, as shown in FIG. 14 or the like, the caulking 20 is done in many places. The engagement of the hole 20-1 and the rib 20-2 is made, for example, to secure the connecting point between the front and rear panels 506 and 507 by multiple positioning 20*c*, as shown in FIG. 14 or the like. As shown in FIGS. 21-1 and 21-1-1, according to the objective of the caulking 20, a clearance between the hole 20-1 and the rib 20-2 may be extremely small. Yet, it is just an example.

When conducting the positioning 20*c*, the caulking 20 may not be necessarily conducted (FIG. 21-1). As such, through the positioning 20*c* and/or the caulking 20, the connecting point between the front and rear panels 506, 507 is easily positioned and fixed. Therefore, the front and rear panels 506, 507 can be fixed and formed by a single touch operation.

Such a structure as the caulking 20 and the positioning 20*c* can be introduced to the caulking 20, as shown in FIG. 25-1, or to the front and rear panels 600, 601 of the side frame 6, as shown in FIG. 23. The structure to process the upper frame unit 5-5 by the caulking 20 and the welding 11 is presented in each embodiment. One of the examples is shown in FIG. 25-2. This chart (FIG. 25-2) shows the preferred embodiments made by the various combinations, and A (a) to E (a) are preferably used. Yet, they are not limited. The integration of the side frame unit 6-6, to be referred to below, is conducted through the same process.

FIG. 25-3 is a chart showing the various embodiments regarding the configuration of the hole 20-1, which are used for the caulking 20 and the positioning 20*c*, of which types A (d) to J (d) are preferable examples.

FIG. 22 is the enlarged cross-sectional top view showing half of the relationship to fix the front and rear panels 506 (the front portion of the seat 1), 507 (the rear portion of the seat 1) and the bracket 8 by caulking 20. This enlarged cross-sectional view shows an example to firmly attach the bracket 8 to the front and rear panels by caulking 20.

As shown in FIG. 23, the side frame 6 can also be made of a side frame unit 6-6 comprising a front panel 600 and a rear panel 601. In this embodiment, it is preferable to integrate the front panel 600 and the rear panel 601 by a plurality of caulking 20. The caulking 20 is conducted by using a tool, and a metallic mold or the like. Also, the caulking 20 is conducted by various methods using the holding structure 20a with the simple metallic mold, as shown in FIG. 21-3 concerning the upper frame unit 5-5, the latching structure 20b of concave-convex engagement, as shown in FIG. 21-4, or the like. Yet, they are not limited.

FIG. 24 shows an example to introduce a structure made of the rectangularly-shaped bracket 8, the headrest support 23 and the headrest stay 21, as shown in FIGS. 13-1 to 13-3, to the front and rear panels 506, 507 which make up the upper frame unit 5-5 (upper frame 5). FIG. 24 also shows a structure in which the rectangular-shaped through-hole 509 is provided on the front and rear panels 506, 507 of the upper frame unit 5-5, and the front and/or rear panels are bulged.

This embodiment prevents the upper frame 5-5, the bracket 8 and the headrest 22 from deflecting, twisting, tipping over, displacing or the like, so as to realize the normal performance of the headrest 22.

FIG. 27 is the structure of a conventional upper frame showing the upper frame 5000 as have been deflected (deflection X) by the force of a rear-end motor-vehicle collision. As shown in FIG. 27, the upper frame 5000 is deflected, and the bracket 8000 and the headrest (not shown in the drawing) go back, which may cause whiplash. The disclosed structure overcomes this problem and describes, in contrast, the conventional invention as follows.

FIG. 26-1 shows the conventional structure of the attaching portion 500000 softly pressed when attaching the bracket 8000, and shows that the length to the end portion 5000d of the upper frame 5000 is shortened. Thus, the curvature (bending allowance) of the end portion 5000d of the upper frame 5000 becomes smaller in making a sharp angle.

Thus, for example, the outer side especially of the curvature, becomes small (about 60 degrees), and the thickness is reduced which results in poverty of strength of the upper frame 5000 by the negative effect, i.e. of deflecting, twisting or the like. Furthermore, the bracket 8000 and the headrest 22 may be adversely affected by deflecting and twisting, as well as by tipping over, thus displacing, so that the headrest 22 will not function in the normal manner.

In FIGS. 26-2 to 26-4, as shown in FIG. 6-1, 6-2 or the like, when the attaching portion 500 is strongly pressed, the curvature of the end portion 500d of the upper frame is greatly obtained, since the length 500c becomes shorter and the size between the attaching portion 500 and the end portion d (curving end) becomes larger. As such, the outer side of the bending radius R becomes larger, and the thickness will not be increased. The thickness is secured.

An example of such a theoretical structure is shown in FIG. 6-1 or the like, where by the pipe diameter D1 of the end portion 500d aims to become about the same as the pipe diameter D0 of the conventional pipe, and the pipe thickness t1 of the end portion 500d aims to become about the same as the thickness t1 of the end portion t0 of the conventional pipe. And, for example, when the bending radius R is set at 80 degrees, then the similar effect to the true circle (precise circle) of the upper frame 5 is expected, which eventually is effective in preventing the pipe from deflecting, twisting or tipping over, as is conventionally seen, (and in enhancing the strength) and to avoid whiplash or other injuries.

Furthermore, as shown in FIGS. 26-3 and 26-4, the bending radius R of FIG. 6-1 is set at about 100 to 130 degrees which leads to more excellent results. Naturally, this embodiment shows more benefit than that shown in the aforementioned FIG. 6-1 or the like.

The structure of the attaching portion 500, as described in the aforementioned FIGS. 9-1 to 9-6, comprising the upper frame 5 with the cutout 502 and the welding points of the half cutout pipe 503 and the flat 503a or the like, seems effective to the embodiment, as described in the aforementioned FIGS. 6-1, 6-2 or the like. In this embodiment, the bending becomes greater to improve the strength.

A similar effectiveness can be expected in each embodiment of the pin 13, as shown in FIGS. 10-1 to 11-3, and of the upper frame unit 5-5, as shown in FIGS. 12-1 to 12-8, and of the side frame unit 6-6, as shown in FIGS. 12-1 to 12-8 and FIG. 23.

FIG. 28 describes a theoretical structure of bending the pipe (the upper frame 5), whereby the straight pipe portion R0 has a diameter of between D0 and D0 and of a thickness between t0 and t0 (which is not shown in this drawing but shown in FIGS. 6-1, 6-1- or the like). Thus, there is no such great difference between the diameter and the thickness. Therefore, it is recognized that if the bending radius R is great, the strength of the pipe will not be affected.

FIG. 29 is a chart in which the vertical axis shows deflection and the horizontal axis shows stress (load weight). Deflection tolerance range D shows no problem of any function of the upper frame 5, of the bracket 8 or of the headrest 22, which means that such range can be used. However, when exceeding the deflection tolerance range D and reaching elastic fatigue range E, the elastic restoring force (repelling force) is not obtained, so that such range cannot be used because of shear F. Problems arise in such an inoperable range and by shear F. To overcome such problems, this present invention focuses on expanding the deflection tolerance range D.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A structure, comprising:
    an upper frame of a vehicle seat comprising an attaching portion which is flat and
    disposed between two vertical half cutout portions formed at both lateral ends of said attaching portion, and
    a headrest bracket which comprises a front side, a rear side, and two lateral sides joining said front side and said rear side,
    wherein in a longitudinal view of said upper frame, hollows are disposed between said vertical half cutout portions and said attaching portion,
    wherein lateral sides of said headrest bracket face said vertical half cutout portions and said hollows,
    wherein said lateral sides of said headrest bracket are vertically welded to said upper frame at a point on said lateral sides that is intermediate of a junction between said lateral sides with said rear side and a junction between said lateral sides with said front side of said headrest bracket, and
    wherein at least one of an upper end and a lower end of said attaching portion is horizontally welded to said rear side of said headrest bracket.

2. The structure of claim 1, further comprising a side frame of a seat, said side frame including front and rear panels,
    wherein ends of said upper frame are axially formed in a flat cylindrical shape, and wherein said flat cylindrical shape of said ends of said upper frame are connectable to said side frame of said seat, said side frame including front and rear panels.

3. The structure of claim 1, further comprising
a headrest support which is rectangular in top view, said headrest support having a head and a leg and including a rectangular through-hole, and
a headrest stay which is rectangular in cross-section,
wherein said headrest bracket is rectangular in top view,
wherein said leg of said headrest support is inserted into said headrest bracket, and
wherein said headrest stay is inserted into the rectangular through-hole of said headrest support.

4. The structure of claim 1,
wherein a length of said attaching portion in a lateral direction is substantially the same as a length between said lateral sides of said headrest bracket.

5. The structure of claim 1, wherein said vertical half cutout portions are formed by vertically cutting two slits in said upper frame and pressing flat a portion of said upper frame between said two slits.

6. The structure of claim 1, wherein upper and lower ends of said vertical half cutout portions are curved, and wherein a mid-section between said upper and lower ends of said vertical half cutout portions are vertically formed.

7. A structure, comprising:
an upper frame of a vehicle seat, comprising an attaching portion which is flat and disposed between two vertical half cutout portions formed at both lateral ends of said attaching portion, and
a headrest bracket which comprises a front side, a rear side, and two lateral sides joining said front side and said rear side,
wherein in a longitudinal view of said upper frame, hollows are disposed between said vertical half cutout portions and said attaching portion,
wherein lateral sides of said headrest bracket face said vertical half cutout portions and said hollows,
wherein said lateral sides of said headrest bracket are vertically welded to said upper frame at least along a portion of said vertical half cutout portions, and
wherein at least one of an upper end and a lower end of said attaching portion is horizontally welded to said rear side of said headrest bracket.

8. The structure of claim 7, further comprising a side frame of said vehicle seat, said side frame including front and rear panels,
wherein ends of said upper frame are axially formed in a flat cylindrical shape, and
wherein said flat cylindrical shape of said ends of said upper frame are connectable to said side frame of said seat, said side frame including front and rear panels.

9. The structure of claim 7, further comprising:
a headrest support which is rectangular in top view, said headrest support having a head and a leg and including a rectangular through-hole, and
a headrest stay which is rectangular in cross-section,
wherein said headrest bracket is rectangular in top view,
wherein said leg of said headrest support is inserted into said headrest bracket, and
wherein said headrest stay is inserted into the rectangular through-hole of said headrest support.

10. The structure of claim 7,
wherein upper and lower ends of said vertical half cutout portions are curved, and
wherein a mid-section between said upper and lower ends of said vertical half cutout portions are vertically formed.

11. The structure of claim 7,
wherein a length of said attaching portion in a lateral direction is substantially the same as a length between said lateral sides of said headrest bracket.

12. The structure of claim 7,
wherein said vertical half cutout portions are formed by vertically cutting two slits in said upper frame and pressing flat a portion of said upper frame between said two slits.

* * * * *